United States Patent [19]
Larsen

[11] Patent Number: 4,736,715
[45] Date of Patent: Apr. 12, 1988

[54] ENGINE WITH A SIX-STROKE CYCLE, VARIABLE COMPRESSION RATIO, AND CONSTANT STROKE

[75] Inventor: Gregory J. Larsen, Lakeland, Fla.

[73] Assignee: Medicor Science, N.V., Netherlands Antilles

[21] Appl. No.: 779,874

[22] Filed: Sep. 25, 1985

[51] Int. Cl.⁴ ............................................. F02B 75/26
[52] U.S. Cl. .................................. 123/64; 123/58 B; 123/25 C; 123/318
[58] Field of Search ................. 123/25 R, 25 B, 25 C, 123/64, 58 R, 58 B, 58 BA, 58 BB, 432, 318

[56] References Cited

U.S. PATENT DOCUMENTS

| | | | |
|---|---|---|---|
| 1,339,176 | 5/1920 | Dyer | 123/25 R |
| 1,433,650 | 10/1922 | Powell | 123/318 |
| 1,501,392 | 7/1924 | Burtnett et al. | 123/64 R |
| 1,698,102 | 1/1929 | Michell | 123/58 B |
| 1,950,970 | 3/1934 | Chilton | 123/58 BB |
| 2,280,375 | 4/1942 | Chilton | 123/58 BB |
| 2,465,638 | 3/1949 | Eckert | 123/58 BC |
| 2,532,254 | 11/1950 | Bouchard | 123/58 BA |
| 2,671,311 | 3/1954 | Rohrbach | 123/25 R |
| 3,074,228 | 1/1963 | Lee | 123/25 C |
| 3,319,874 | 5/1967 | Welsh et al. | 123/58 BA |
| 3,356,080 | 12/1967 | Howard | 123/58 R |
| 3,416,502 | 12/1968 | Weiss | 123/432 |
| 3,964,263 | 6/1976 | Tibbs | 123/25 C |
| 4,090,478 | 5/1978 | Trimble et al. | 123/58 B |
| 4,143,518 | 3/1979 | Kellogg-Smith | 123/64 R |
| 4,144,771 | 3/1979 | Kemper et al. | 123/78 E |
| 4,174,684 | 11/1979 | Roseby et al. | 123/58 BC |
| 4,281,626 | 8/1981 | Fishe | 123/25 C |
| 4,294,139 | 10/1981 | Bex et al. | 123/58 B |
| 4,357,917 | 11/1982 | Aoyama | 123/90.16 |
| 4,433,596 | 2/1984 | Scalzo | 123/58 B |
| 4,470,394 | 9/1984 | Tadokoro et al. | 123/432 |

FOREIGN PATENT DOCUMENTS 0160296 3/1921 United Kingdom ................ 123/318

*Primary Examiner*—Craig R. Feinberg
*Attorney, Agent, or Firm*—Brumbaugh, Graves, Donohue & Raymond

[57] ABSTRACT

An engine comprises an output shaft journalled in a crankcase for rotation about an axis, an even number of cylinders, each having its axis parallel to the shaft axis, arranged in diametrically opposite pairs radially equidistant from the shaft axis and equally spaced-apart circumferentially, and a piston movable axially along each cylinder. A cross-head beam for each pair of pistons is connected to the respective pistons and journalled on a carrier that is received on the shaft for rotation with and movement axially along the shaft. A mechanism selectively moves the carrier axially along the shaft to vary the clearance volumes of the cylinders. The engine operates on a six-stroke cycle consisting of a four-stroke combustion cycle followed by a two-stroke steam cycle. The water injected for the steam cycle cools the engine. The intake air for the combustion cycle is supercharged and preheated before induction. There are two intake ports for each cylinder, each having a cam-actuated intake valve, and a mechanism for selectively varying the timing of one of the intake valves of each cylinder to vary the mass of a mixture of fuel and air inducted into the respective cylinder by delaying the closing of the variable timed valve until a selected time during the upstroke of the piston.

21 Claims, 8 Drawing Sheets

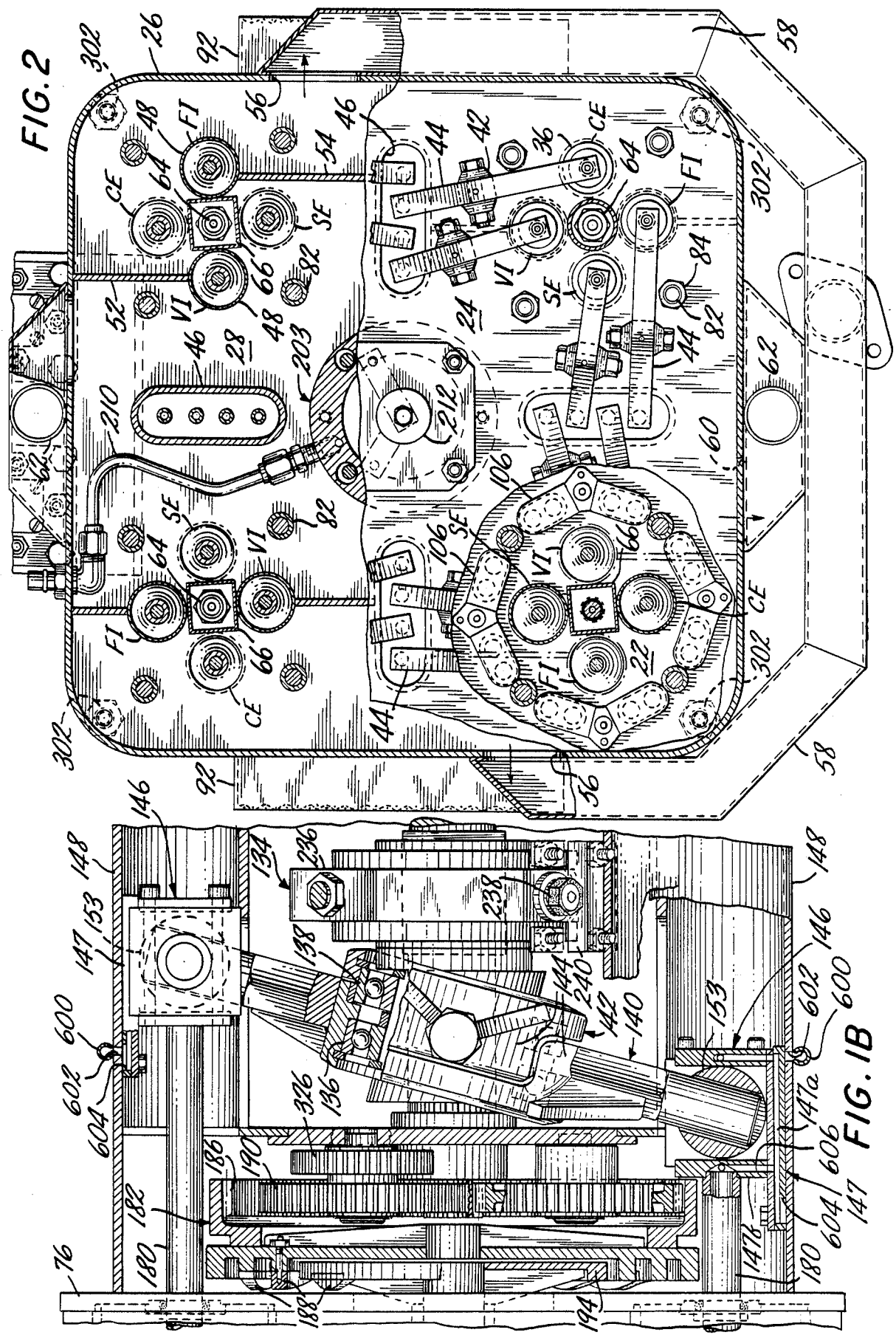

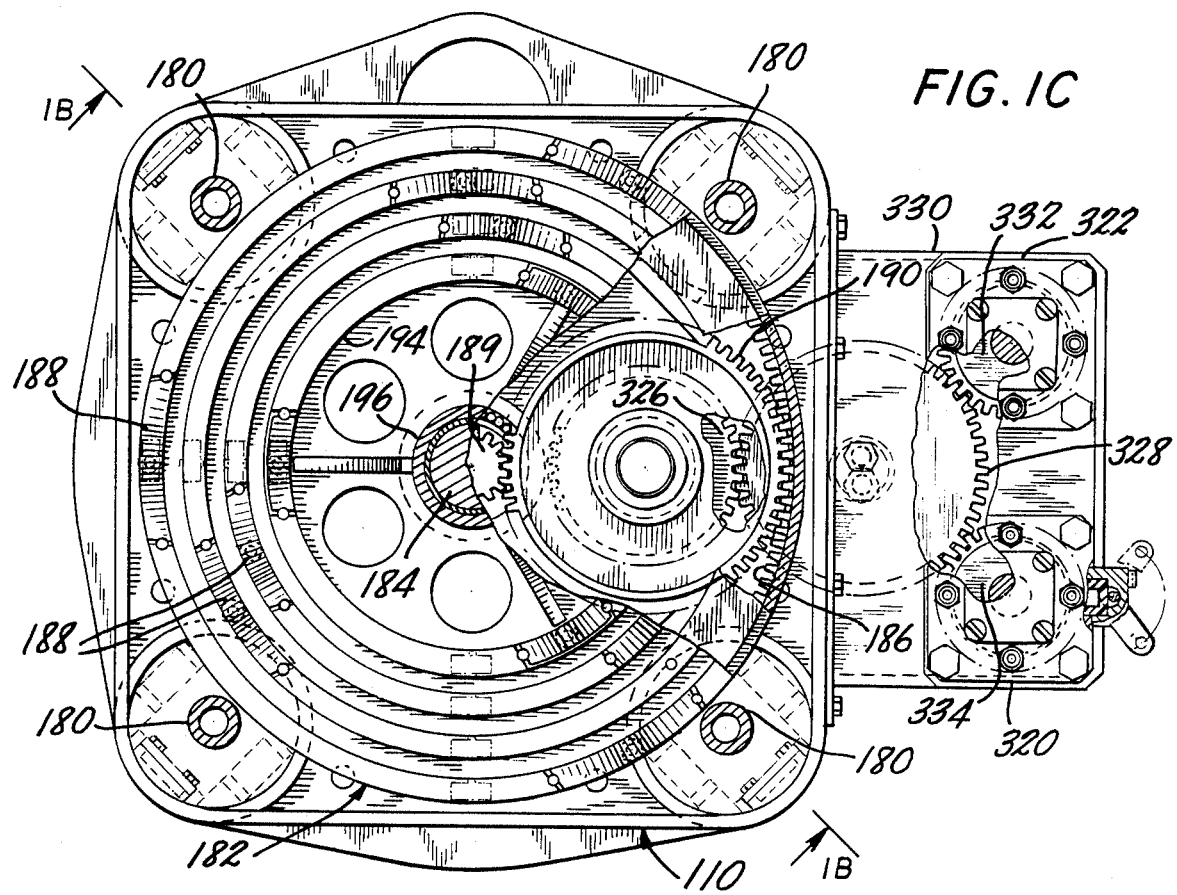
FIG. IC
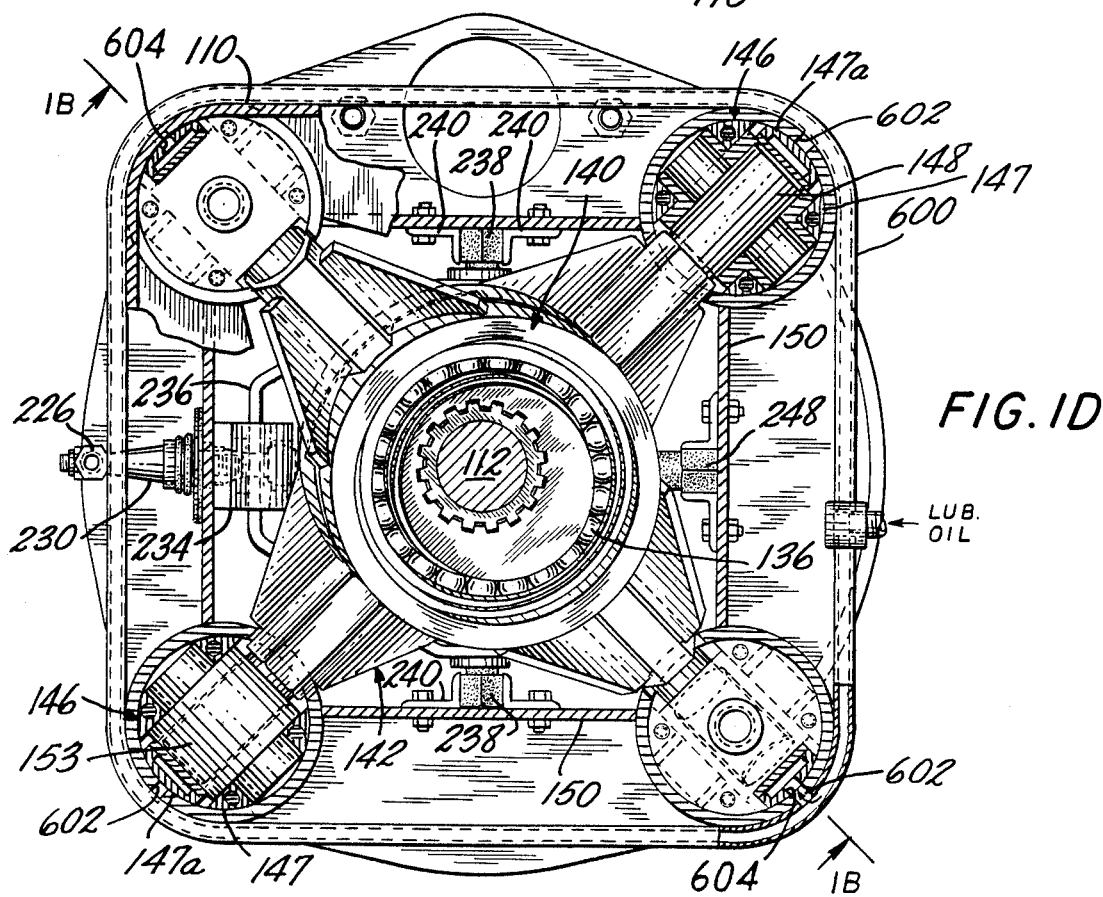
FIG. ID

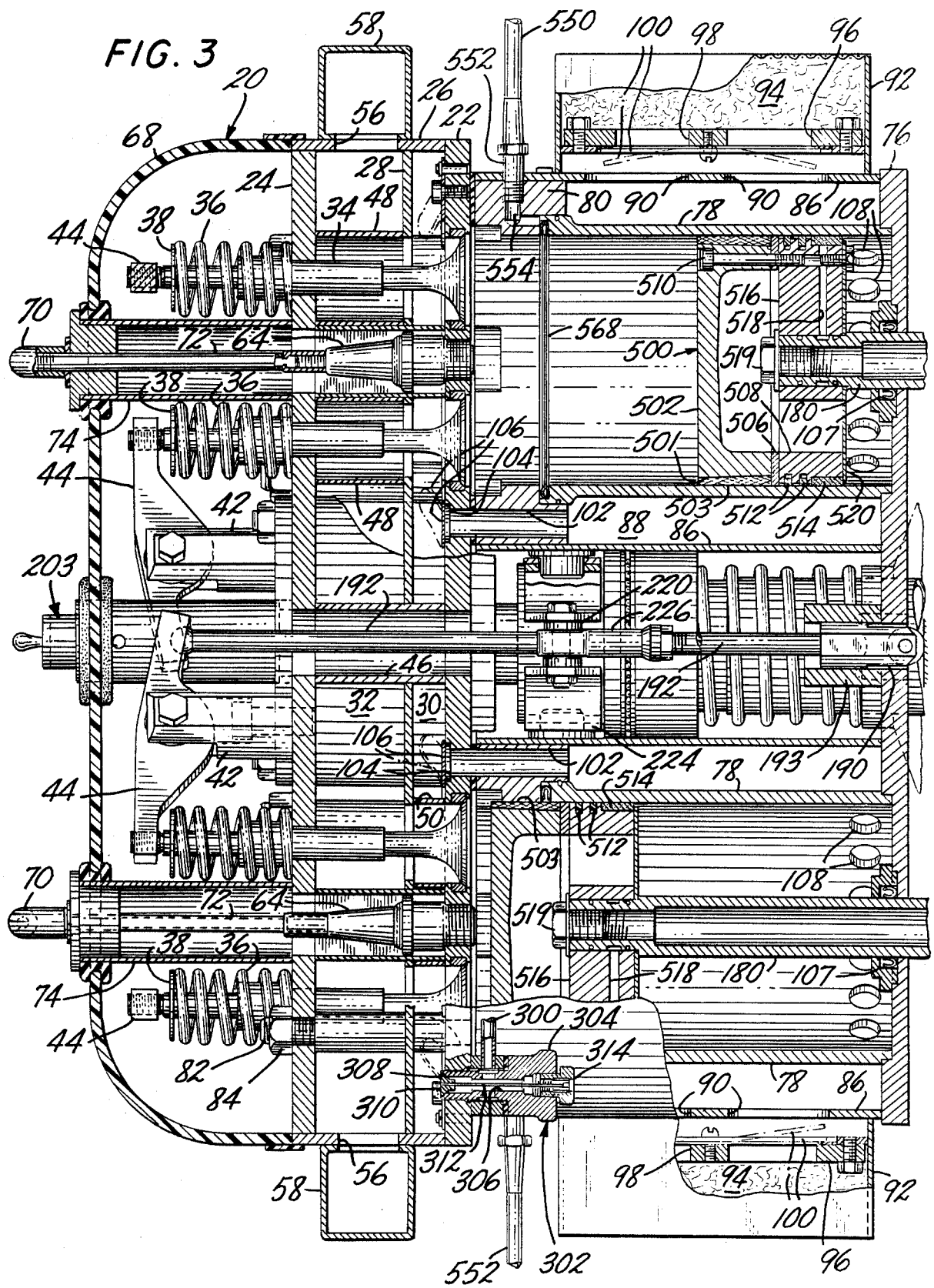

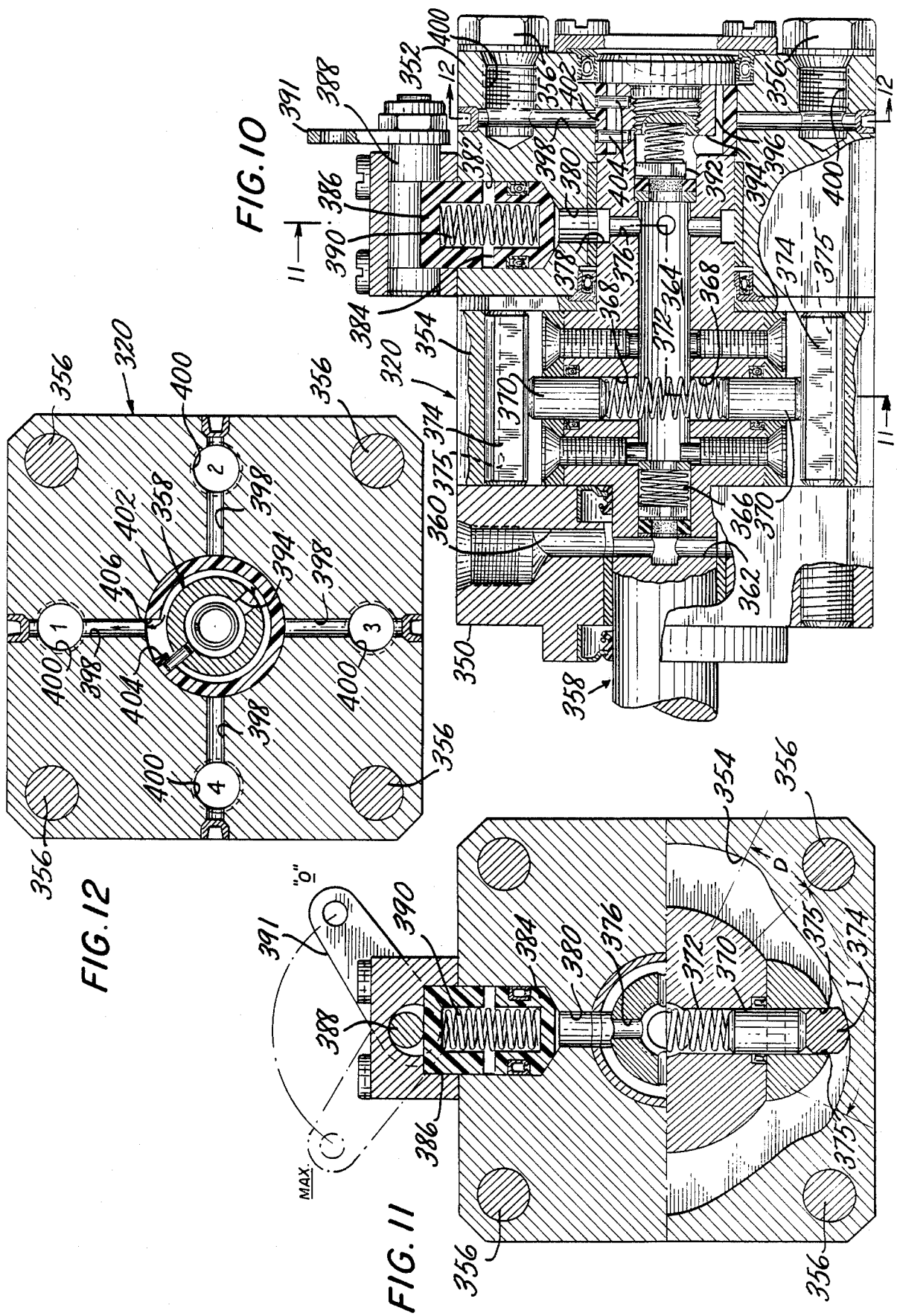

ENGINE WITH A SIX-STROKE CYCLE, VARIABLE COMPRESSION RATIO, AND CONSTANT STROKE

BACKGROUND OF THE INVENTION

Otto cycle engines are very inefficient. Only about one-third of the heat available in the fuel burned in the engine is delivered as work at the drive shaft. About one-third of the heat is lost in the exhaust gases. Another one-third is rejected to the coolant, lost by radiation and used to overcome mechanical friction. In by far the most common uses of Otto cycle engines, vehicles, less than optimum engine performance under most driving conditions further reduces overall efficiency in several ways.

Four-stroke Otto cycle engines perform most efficiently at or near full power (i.e., wide-open throttle) for two principal reasons. First, the throttle is wide-open, so the fuel-air charge is inducted with the minimum restriction, as compared to the pumping loss associated with a manifold vacuum condition at partial throttle settings in which a larger part of the engine power is used to induct the charge. Second, the maximum mass of fuel and air are inducted at and near wide-open throttle, so the pressure of the charge at the time of ignition and combustion is at a peak. When the mass of the charge is diminished by throttling the intake, the pressure at the time of ignition and combustion are well below the optimum for the highest thermal efficiency of the fuel combustion.

The efficiency losses discussed above have been long recognized, and many proposals have been made to reduce or eliminate them. For example, Weiss U.S. Pat. No. 3,416,502 (1968) proposes reducing the pumping loss and eliminating the throttle of an Otto cycle engine by providing variable-timed intake valves that are controlled to stay open during part of the compression stroke at less than full power so that the fuel-air mass and, therefore, power are controlled without throttling. To the same effect is Aoyama U.S. Pat. No. 4,357,917 (1982).

There are many patents for Z-crank engines in which the displacement or the clearance volume or both are varied by changing the position or angle or both of the crank arms, thereby providing a variable compression ratio in order to improve combustion efficiency. Many of the engines in this area of the patent literature inherently provide a reduced displacement volume in conjunction with an increased clearance volume, and vice versa, so whatever advantage may be gained from maintaining a controlled compression of the fuel-air charge is offset by a reduced expansion ratio. Exemplary of the U.S. patents on Z-crank engines are the following:

Eckert U.S. Pat. No. 2,465,638 (1949)
Welsh et al U.S. Pat. No. 3,319,874 (1967)
Kemper et al U.S. Pat. No. 4,144,771 (1979)
Roseby et al. U.S. Pat. No. 4,174,684 (1979)
Bex et al. U.S. Pat. No. 4,294,139 (1981)
Scalzo U.S. Pat. No. 4,433,596 (1984)

The problem of heat rejection to a coolant has been addressed recently in the widely publicized efforts to develop an "adiabatic" Diesel engine using ceramic-lined (insulating) cylinders. To date, the results are reported to be disappointing. It appears that nearly all of the reduction in heat rejection to a coolant is offset by increased heat rejection to the exhaust, with little change in the thermodynamic cycle.

It has been suggested that some of the heat lost to the coolant can be used to produce power; the following U.S. patents relate to engines that carry out six-stroke work cycles, consisting of the conventional four strokes of an Otto cycle followed by the two strokes of a steam cycle, the steam being produced by injecting water into the cylinders after the combustion-exhaust stroke:

Dyer U.S. Pat. No. 1,339,176 (1920)
Burtnett et al. U.S. Pat. No. 1,501,392 (1924)
Rohrbach U.S. Pat. No. 2,671,311 (1954)
Tibbs U.S. Pat. No. 3,964,263 (1976)
Kellogg-Smith U.S. Pat. No. 4,143,518 (1979)

There are many reasons why the concepts of the patents referred to above have not been adopted commercially. For one thing, they involve complex mechanisms and controls that add to the initial cost of producing the engine and the operating costs of maintaining it. For another, there are alternative ways of improving engine efficiency that are more readily adopted in engines of more conventional design. Examples are the higher operating temperatures afforded by higher-pressure cooling systems, higher compression ratios afforded by better cooling of the engine head (thin domes, better finish for reduced incidence of hot spots, aluminum heads), improved shaping of the combustion dome for reduced knock at high compression ratios, higher octane fuels, better control of ignition and fuel supply and many others. The various proposals discussed above, moreover, often provide but a very small improvement in efficiency that is insufficient to warrant the greater costs and the greater potential for maintenance and durability problems introduced to gain the advantage. In many cases the geometry of the engine makes it significantly less desirable than conventional designs, notably in the case of vehicle engines. Also, until recently the cost of fuel has been low enough to make it, in the final analysis, uneconomical to turn to relatively costly engine designs and support systems.

SUMMARY OF THE INVENTION

There is provided, in accordance with the present invention, a reciprocating piston type internal combustion engine having many unique features that improve efficiency by significantly reducing various losses encountered in conventional engines. Some of the features of the invention, though preferred, are optional. An engine embodying the primary characteristics of the invention should provide significantly better fuel economy than the best present day Diesel engines at a lower cost and is expected to provide greater specific output than a Diesel in terms of both displacement (HP/cu in) and weight (HP/lb weight). Emissions problems should be less than in current gasoline engines, due to more efficient combustion and lower peak temperatures; exhaust gas circulation may not be required, and the demands on a catalytic converter should be less.

In accordance with the present invention an engine comprises an output shaft journalled in a crankcase for rotation around an axis, an even number of cylinders, each having its axis parallel to the shaft axis, arranged in diametrically opposite pairs radially equidistant from the shaft axis and equally spaced-apart circumferentially, and a piston reciprocably movable axially along each cylinder. A crosshead beam for each pair of pistons is connected to the respective pistons and is rotatably mounted on a carrier that is received on the shaft for rotation with and for movement axially along the shaft. A suitable mechanism is provided for moving the carrier axially along the shaft to vary the end clearance volumes of the piston/cylinders. Engine cooling and delivery of steam power are provided by injecting water into each cylinder following each combustion exhaust stroke of the corresponding piston. According to this aspect of the present invention, the cams that actuate the intake valves are timed to open the intake valve or valves in each cylinder for induction of a fuel-air mixture every third downstroke. Each cylinder has a combustion exhaust port with a camactuated valve and a steam exhaust port having a camactuated valve. The respective exhaust valves are timed such that the engine operates in a six-stroke cycle consisting of a four-stroke combustion cycle and a two-stroke steam cycle.

In a preferred embodiment, each piston has a ring of porous, thermally conductive material around the perimeter of the top, the material having a high ratio of surface area to mass for rapid heat transfer. The water is injected through a nozzle associated with the top of the cylinder wall arranged to inject the water generally radially into and substantially entirely around the porous conducting ring, whereby the water permeates the ring and flashes to steam that provides the power stroke of the steam cycle. Preferably, the water injection is controlled in relation to the engine temperature. In particular the quantity of water is regulated by varying the durations of the injections, the times of the beginnings of the injections being varied with maximum injections beginning at about 45 degrees before top dead center and the ends of the injections being fixed such that each injection ends at or just after top dead center. The porous ring of the piston may be a band of fine wire cloth wrapped in numerous layers around the top of the piston. The movement of the porous layer relative to the annular nozzle (as a result of the piston movement) improves the heat exchange efficiency to the very high level needed for an efficient steam cycle. The invention, in this regard, provides the extremely high flashing rate required by the short time available for vaporization of the injected water at normal engine speeds, which is of the order of 45° at the end of the combustion exhaust stroke.

Though not essential, it is advantageous to minimize heat flow from the pistons to the cylinder walls through the piston rings, thereby maximizing the amount of heat available for the steam cycle. To this end, the pistons may be composed of a head member, which includes the porous material at the perimeter, a skirt member having one or more sealing rings and a disc of a thermal insulating material interposed between the head and skirt members.

As described briefly thus far, the present invention provides for cooling of the engine by direct injection of water into the cylinders and for use of a major part of the heat that would otherwise be rejected to the coolant to produce power. Reducing significantly the loss of heat due to engine cooling and using that heat for power output is one objective of the invention.

The present invention further provides for varying the clearance volume in order to maintain a near optimum compression of the fuel-air mass for efficient combustion. For reduced intake of the fuel-air mixture (reduced power demand), the clearance volume is reduced so that the pressure of the mixture at the end of the compression stroke is kept more or less constant for all levels of engine power, thereby improving the efficiency and reducing the loss in efficiency that occurs in conventional engines due to reduced pre-ignition pressure when the engine is operating at less than nearly wide open throttle. At the same time, however, the strokes of the pistons remain constant for all clearance volumes, so that the effective expansion ratio is increased for all but the full power condition of operation, which further improves the thermal efficiency of the engine through more complete combustion, reduced exhaust losses and maintenance of a long power stroke at less than fuel power. Improved combustion efficiency is another objective of the invention.

As a preferred but optional aspect of the engine, each cylinder may have two intake ports, each having a cam-actuated intake valve, and a suitable mechanism for selectively varying the timing of one of the intake valves of each cylinder, thereby to vary the mass of a mixture of fuel and air inducted into the respective cylinder by delaying the closing of the variable time valve until a selected time during the succeeding upstroke of the piston. The mechanism for moving the carrier of the crank mechanism and the mechanism for varying the timing of the variable time valves can be coupled for automatic coordination of the mass of the fuel and air inducted into the cylinders and the end clearance volumes of the piston/cylinders. The other valve of each cylinder operates at a fixed timing, relative to the rotation of the shaft, such that it is open throughout substantially the entire intake stroke.

Induction of variable fuel-air charges using two intake ports for each cylinder without throttling, as preferred in the invention, reduces flow losses due to friction, turbulance and limited port open area, as compared to a single-intake valve, even at full power. When the engine operator calls for a lower level of power from the engine, the variable time valve is retarded relative to the fixed time valve and thus opens at some point during the intake stroke and remains open during part, even a major part, of the succeeding upstroke of the piston. Accordingly, some or even most of the mixture inducted on the piston downstroke is pushed back out through the open variable time valve on the succeeding upstroke, thus reducing the mass of the fuel and air mixture remaining at the time the variable time valve closes. During the remaining part of the upstroke, the mass is compressed for subsequent ignition and combustion. According to this aspect of the present invention, which is known per se in the prior art as is discussed in the introductory section of the present specification, the mass of the fuel-air mixture inducted into the cylinders is controlled by the timing of the variable time valve, thus eliminating the need for a throttle plate and the resulting pumping loss that occurs at reduced levels of power when the mixture is inducted against a manifold vacuum. Reducing pumping and other flow losses associated with induction is yet another objective of the invention.

In summary, therefore, a preferred embodiment of the invention provides for maintenance of a maximum combustion efficiency and a low fuel consumption rate throughout normal operating ranges due to a near-optimum pre-ignition pressure at all power levels by variation of the compression ratios between minumum and maximum outputs without changing the piston stroke, utilization of heat extracted from the piston and the combustion chamber walls to cool them for producing steam power, and induction into the cylinders with low restrictions for high volumetric efficiency, induction that is not throttled and has minimum pumping losses.

Throttling of the intake of Otto cycle engines has one desirable attribute in vehicular applications, engine braking. An engine according to the present invention will provide only minimal engine braking unless, as is known in Diesel truck tractors, a butterfly valve is installed in the exhaust pipe.

Preferred embodiments of the present invention include the following additional features, either individually or in combination.

The pistons are connected by connecting rods to the crosshead beams by slider assemblies, each of which includes a cylindrical slideway that forms part of the crankcase housing and has an axis aligned with the corresponding cylinder, a slider received in each slideway and a coupling between the crosshead beam, the connecting rod and the slider that provides for biaxial rotation and for sliding motion of the beam, relative to the connecting rods, such that the connecting rods move solely axially of the cylinders.

A supercharging chamber within each working cylinder of the engine is defined by the underside of the piston and an end wall having openings through which the corresponding connecting rod passes. The connecting rod is sealed to the end wall at the opening. A one-way valve admits ambient air into the supercharging chamber on each upstroke of the piston, and a second one-way valve controls the discharge of compressed air from the supercharging chamber upon each downstroke of piston into an intake chamber that communicates the supercharging chambers (through the second one-way valves) with the intake ports of each cylinder. With the above-described preferred characteristics, the benefits of supercharging, which are known per se. are afforded, and the intake manifold is maintained as a trapped volume for the fuel-air mixture that is pushed back out of the cylinders during operation at reduced power levels.

A minor part of the heat normally rejected from the engine cylinders through the walls of the cylinder bores to a coolant in a conventional engine can be used to heat the supercharged air in the supercharging chambers in an engine according to the invention to evaporate the fuel. Cooling of the cylinder bores by the air inducted for supercharging should, however, be minimized for improved efficiency of the steam cycle. Additional heat for fuel vaporization is available in the hot walls of the cylinder tops and the walls of the combustion exhaust and steam exhaust compartments. At less than full loads, fuel and air entering the cylinders is heated and then pushed back out into the hot environment of the manifold chamber.

For conservation of heat in the cylinder bore walls, each working cylinder is surrounded by a tube that defines an annular portion of the supercharging chamber. The air (a poor conductor of heat) in the annular chamber tends to insulate the cylinder bore walls for heat retention. Supercharged air is delivered on each piston downstroke through a plurality of spaced-apart discharge openings adjacent the top of the annular portion and through one-way discharge valves into the intake chamber. The supercharging counteracts the adverse effect of heating the inducted air by maintaining a high mass flow of air into the intake chamber. Minimization of heat loss from the cylinder walls to the inducted air, consistent with having enough overall heat input to the air for fuel vaporization before ignition, can also be attained by providing an insulating layer on the outside of the cylinder walls.

In a preferred embodiment of the present invention the mechanism for moving the crosshead beam carrier axially along the shaft to vary the compression ratio includes a spider received for rotation with and axial movement along the shaft and carrying bevel gears. A first portion of the shaft on one side of the spider has fine threads, and a second portion of the shaft on the other side of the spider has fine threads of opposite hand, both sets of threads being of the same pitch. A first ring having a bevel ring gear meshes with the bevel gears on the spider and is threaded internally onto the first threaded portion, a thrust-bearing being interposed between the first ring and the carrier. A second ring having a bevel ring gear meshing with the bevel gears of the spider is threaded internally onto the second threaded portion of the shaft. First and second conical brake surfaces on the respective first and second rings are selectively engagable with a brake sleeve having brake surfaces matching the brake surfaces on the two rings. A mechanism is provided for selectively shifting the brake sleeve axially along the shaft to engage one or the other of the brake sleeve surfaces with the brake surface of the corresponding first and second ring. Upon such an engagement the rotation of the ring that is engaged is retarded, relative to the shaft, the bevel gears advance the rotation of the other ring, and the two rings thread themselves along the threaded portions of the shaft and move the carrier axially along the shaft.

The mechanism for moving the cross-head beam assembly just described is useful in any situation where it is desirable to use the power of a rotating shaft to move an object along the shaft. When the amount of movement desired is large, the part of the shaft along which the object is to be moved is provided with both right and left threads of the same pitch. Accordingly, the respective right and left hand rings can move along the entire threaded portion of the rotating shaft. This expedient is also useful in the engine of the present invention, since it can simplify assembly.

In order to coordinate the position of the crosshead beam assembly and the pistons, which varies the clearance volume, with the timing of the variable time valves, the brake ring of the mechanism for moving the crosshead assembly and the pistons is mechanically coupled to the mechanism that varies the timing of the variable time valves, thereby to provide automatically a predetermined relationship between the mass of the fuel-air mixture inducted into the cylinders and the clearance volumes of the cylinders. This linkage may include a yoke carrying the brake sleeve for rotation about an axis extending diametrically thereof and mounted in the crankcase for free-floating in a neutral position in which the brake surfaces on the first and second rings run on oil films within the brake surfaces of the sleeve in the absence of an external force applied to the yoke to move the pivot axis of the brake sleeve axially of the shaft.

In a preferred embodiment of the invention, the cam for actuating the fixed time intake valves is a first rotary annular face cam driven by the shaft in a fixed phase relationship to the rotation of the shaft. The cam for actuating the variable time valves is a second rotary annular face cam. The timing is varied by connecting the second cam to the first cam in any selected one of an infinite number of relative angular positions within a range between a fully in-phase relation for full power and a substantially fully out-of-phase relation for substantially no power. In an exemplary embodiment the first cam lies radially outwardly of the second cam and is carried by a shaft that rotates about an axis aligned with the main shaft. The second cam includes a sleeve surrounding and supported by the shaft of the first cam, and the coupling between the two cams is provided by cam slots in the shaft and sleeve of the respective cams and cam followers received in the cam slots for movement lengthwise and circumferentially of the shaft of the first cam. When the followers are moved axially in the cam slots, the rotational position of the second cam relative to the first is altered in a predetermined relationship. The cam followers are carried by a ring, the position of which is established by a controllable linear actuator coupled through a thrust bearing to the ring. By linking the linear actuator to the yoke of the mechanism that adjusts the position of the crank assembly and the pistons for variation of the clearance volumes of the cylinders, a closed-loop servo-control of the clearance volume in a predetermined relationship to the mass of fuel-air mixture called for is obtained.

Because the engine includes a steam cycle, special care is required for lubricating the cylinders. In a preferred embodiment, a lubricating oil supply port opens at the internal surface of each slideway of the crank mechanism at a location swept by the slider, and an oil intake port opens at the external surface of each slider at a location for register with the supply port for a predetermined time during each piston stroke. Oil passages through the slider, the piston connecting rod and the piston hub communicate the intake port of each slider to a lubricating ring on the lower portion of the piston, whereby a controlled amount of oil is supplied during each piston stroke to the lubricating ring which, in turn, wipes a thin film of oil on the cylinder wall during each piston stroke.

Although an engine embodying the present invention can be supplied with fuel by a carburetor or by conventional fuel injectors, the invention preferably includes a fuel injection system based upon a unique fuel injector, which is useful not only in the present invention but in any engine. In particular, the fuel injector of the present invention comprises a body defining a chamber, an inlet opening for admitting fuel to the chamber and an outlet nozzle opening from the chamber, a valve member adapted the seat in sealed relation in the nozzle opening and an elastically tensioned thin wire fastened at one end to the valve member, extending through the chamber and fastened at the other end to the body. The tensioned thin wire is a very simple and effective spring that keeps the valve closed until pressure of fuel supplied to the chamber builds to a certain level, at which point the valve will open and release fuel from the chamber.

The intake chamber of an engine embodying the present invention preferably communicates with the intake ports of all of the cylinders and is supplied with air, preferably by supercharging in the manner described above, and with fuel injected by one or more fuel injectors. In a preferred embodiment the intake chamber is defined in part by the head walls of the engine cylinders. Thus the air and fuel supplied to the chamber are pre-heated by the cylinder head walls, which are in turn are cooled by the incoming air and fuel. With the design of the supercharging system, in which the outlet valves from the supercharged chambers trap the volume of the intake chamber against outflow back into the supercharging chamber, the heating of the incoming air and fuel by the head walls of the engine cylinders does not diminish the mass flow of air and fuel into the cylinders upon induction, and the heat received from the intake manifold is recovered rather than rejected in the thermodynamic cycle.

Another aspect of the supercharging of the engine, according to the present invention, involves providing a better balance between the effective displacement volume of the supercharging chambers and the displacement volumes of the cylinders. This is accomplished by pairing the supercharging chambers in such a way that the supercharging chamber associated with each cylinder communicates with the supercharging chamber associated with another cylinder that is out of phase with it but in which the piston downstrokes partially overlap, whereby the combined effective displacement volume of the paired chambers is less than the total of the individual displacement volumes of the paired chambers. In this way, three supercharging downstrokes of each piston for each intake stroke of a piston precompress a charge volume that more closely matches the need of the engine and avoids the waste of energy resulting from supercharging too large a quantity of the charge. The ability of having the same displacement for both working and supercharging in each cylinder, a simpler mechanical construction, is retained.

There is further provided, in accordance with the present invention, an injection pump that can be used for not only an engine according to the present invention but for any engine. In the present invention the same basic design, but with different displacement volumes, is used for both the fuel injection and water injection in the case of engines having a steam cycle. The injection pump comprises a housing, a rotor rotably received in the housing and an internal lobed cam in the housing. A pair of diametrically opposed pistons are received in pumping cylinders in the rotor and are spring-loaded away from each other into engagement with the cam. A chamber on the rotor communicates with the pumping cylinders and has an inlet with a check valve and an outlet with a check valve. A regulator cylinder in the housing is in constant communication with the rotor chamber and receives a regulator piston that is biased toward a fixed stop establishing a minimum regulator cylinder volume. An adjustable stop member in the regulator cylinder establishes a selected variable stroke of the regulator piston away from the fixed stop. A rotary outlet distributor valve downstream from the outlet from the chamber acting between the rotor and housing distributes the pumped liquid sequentially to multiple outputs. The distributor is omitted when the pump serves only a single output, such as a single fuel injector.

The adjustable stop is adapted to establish a regulator piston stroke in the range of from substantially zero to a stroke providing a displacement volume of the regulator cylinder substantially equal to the total displacement volume of the pumping cylinders. When the regulator piston stroke is zero, the total displacement volume of the pumping cylinders is pumped through the outlet from the rotor chamber on each working stroke of the pumping pistons, as established by the internal lobed cam in the housing. When the displacement volume of the regulator cylinder is substantially equal to the total displacement volumes of the pumping cylinders, the liquid displaced on the working strokes of the pistons is received in the regulator cylinder and is returned to the pumping cylinders of the rotor on the return strokes of the pistons; in other words in the latter condition liquid in the rotor chamber simply moves back and forth between the pumping cylinders and the regulator cylinder, and there is no liquid pumped by the injection pump. Between the two extremes, of course, the amount of liquid pumped by the injection pump is varied in accordance with the position of the adjustable stop of the regulator piston-cylinder.

For better understanding of the invention reference may be made to the following description of an exemplary embodiment, taken in conjunction with the figures of the accompanying drawings.

DESCRIPTION OF THE DRAWINGS

FIG. 1B is an axial side cross-sectional view of a portion of the crankcase portion of the engine, again with portions broken away or shown in full for clearer illustration, the plane of the view of FIG. 1B being taken generally along the lines 1B—1B of FIG. 1C and in the direction of the arrows (see also FIG. 1D);

FIG. 1C is a transverse cross-sectional view of the embodiment taken generally along a broken plane represented by the lines 1C—1C of FIG. 1 and in the direction of the arrows;

FIG. 1D is a transverse cross-sectional view taken generally along a plane represented by the lines 1D—1D of FIG. 1 and in the direction of the arrows;

FIG. 2 is a top view of the engine with the valve cover removed and with successive portions broken away in cross-section, as is more fully described below;

FIG. 3 is a side cross-sectional view of the head and cylinder bore sections of the engine taken generally along the lines 3—3 of FIG. 1 and in the direction of the arrows;

FIG. 10 is an axial side cross-sectional view of an injector pump suitable for use in injecting fuel and water into an engine embodying the invention and also suitable for use in any engine or other periodic liquid injection application;

FIG. 11 is an end cross-sectional view taken along a broken plane of the injector pump, as represented by the lines 11—11 in FIG. 10;

FIG. 12 is an end cross-sectional view of a rotary distributor valve for the injector pump of FIG. 10, the view of being taken generally along a plane represented by the lines 12—12 in FIG. 10 and in the direction of the arrows;

DESCRIPTION OF AN EXEMPLARY EMBODIMENT

Figure 1:
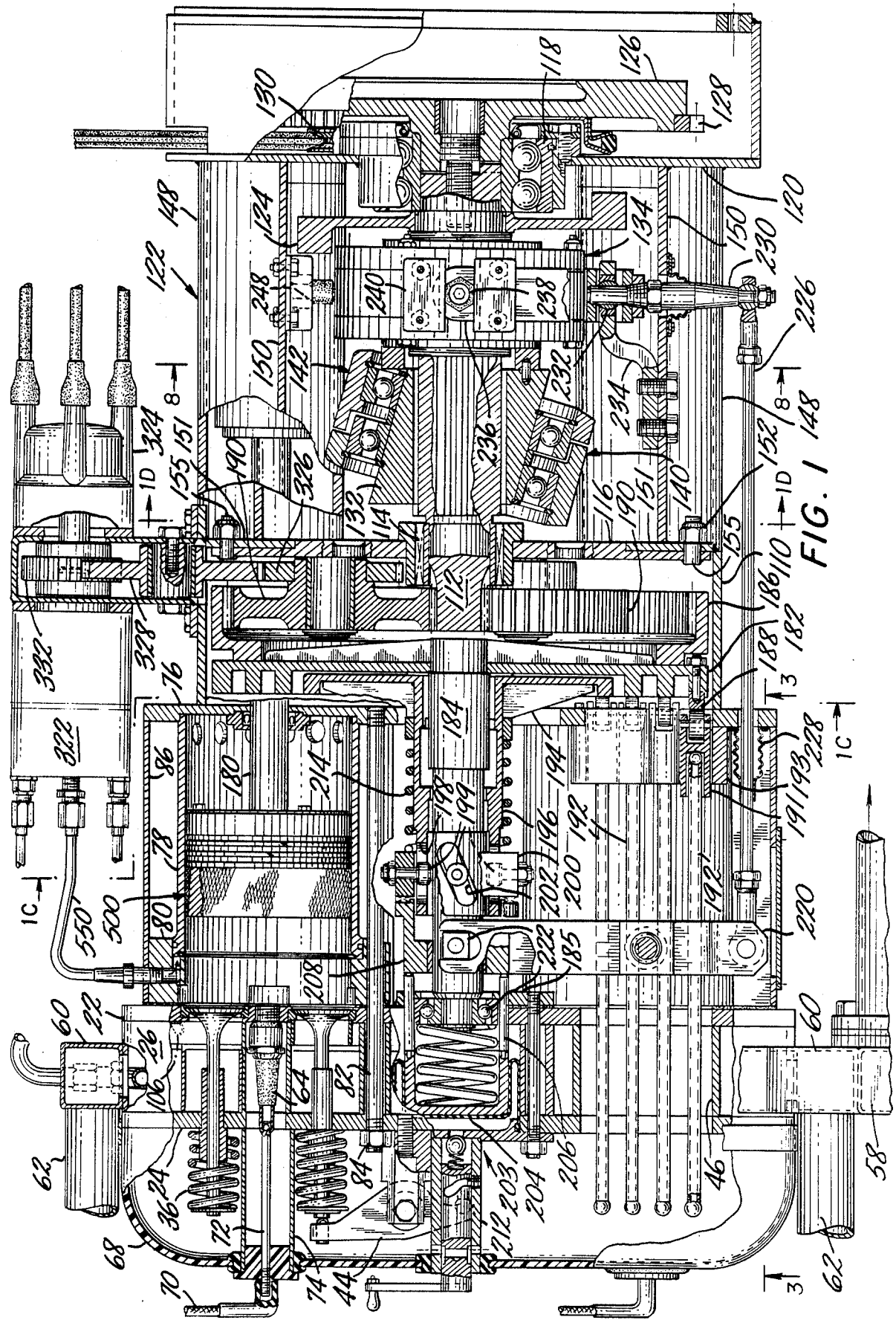
FIG. 1 is a side cross-sectional view of the engine taken along generally radial planes defined by the axis of the engine shaft, the respective planes intersecting at approximately 45°—some parts of the engine are shown in full and other parts broken away in cross-section, as is apparent from a close study of all of the figures of the drawings.

The design illustrated in the accompanying drawings is for a prototype engine. In order to minimize the costs of production, many components that would ordinarily be based on castings have been replaced by welded or oven-brazed assemblies. In general, the parts have been designed for ease of manufacture in a moderately equipped machine shop and for assembly without extensive tooling. For commercial mass production many of the components would be redesigned as castings, as will be readily apparent to those skilled in the art.

The prototype engine is a four cylinder engine having a four inch bore, the cylinders being arranged on a 13 inch diameter circle and the Z-crank having an angle of 15°, thus resulting in a stroke of 3.48 inches and a displacement of 175 cubic inches. The output of the engine is estimated to be 100 HP at 3600 rpm. The engine incorporates all of the features described in the Summary of the Invention section above. Thus, it operates on a six-stroke cycle, which consists of a four-stroke Otto cycle and a two-stroke steam cycle. At the end of the combustion exhaust stroke water is injected into the cylinder and contacts a porous ring around the upper circumference of the piston. The water flashes into steam, which expands and does work on the piston during the next downstroke (which is the second workstroke of each full cycle). At the end of the steam-power stroke, a steam exhaust valve is opened and the low pressure steam is expelled (exhausted) on the next upstroke of the piston and conducted to a condenser for water recovery. Following the steam exhaust each piston carries out the four strokes of an Otto cycle. A complete cycle for each cylinder of the engine requires six strokes and 1080° of rotation of the crankshaft.

Each cylinder has two inlet ports, each with a separate cam-actuated intake valve. One valve operates on a fixed time relationship with the engine cycle, while the other is a variable time valve, in that the phase relationship to the crankshaft rotation can be varied. When both valves open in phase, maximum filling of the cylinder results, and the power output is at a maximum. When the variable time valve is retarded, it opens later than the fixed time valve and remains open following closing of the fixed time valve, i.e., during all or part of the next upstroke of the piston, and some of the fuel-air mixture inducted into cylinder on the intake stroke is pushed back out into the intake manifold chamber of the engine on the next upstroke. Accordingly, compression in the cylinder does not begin until the variable time valve closes, and the power output of the engine is determined by the mass of mixture in the cylinder at the time that the variable time valve closes.

The cylinders of the engine run on axes that are parallel to the shaft axis, and the arrangement of the Z-crank mechanism is such that the crank beams and the pistons are movable axially to a pre-determined, controlled end-clearance position, thus permitting a substantial variation in the compression ratio between maximum and minimum outputs. In the particular design shown in the drawings the mechanical arrangement enables a variation of five to one in the compression ratio between maximum and minimum. By so varying the end clearance volumes in the cylinders, the maximum combustion efficiency is maintained throughout the normal operating range, which results in a low fuel consumption. The mechanisms that control the timing of the variable time intake valve of each cylinder and the variation in the compression ratio, i.e., the clearance volumes of the cylinders, are mechanically connected to provide a pre-determined relationship between the mass of inducted fuel-air mixture and the clearance volumes of the cylinders. Using "state-of-the-art" engine controls, such as a knock sensor for controlling the ignition timing and an air mass-flow sensor for controlling fuel-injection, nearly optimal operating conditions can be maintained throughout the normal operating range of the engine, thus resulting in the best performance of the engine at the lowest fuel consumption at all times.

The crank arrangement of the engine is such that the piston connecting rods run axially of the cylinders (do not rock) which allows the pistons to be double-acting so that the undersides of the pistons can be used to supercharge the air for delivery to the intake manifold. The resulting high volumetric efficiency helps to offset the loss of specific output inherent in the six-stroke cycle.

Referring now to FIGS. 1, 2 and 3 of the drawings, the engine head, which is designated generally by the reference numeral 20 is a square, flat box with rounded corners defined by a base wall 22, an end wall 24 and a perimeter or side wall 26. The interior of the head is separated into various compartments and passages by a weldment that includes a divider plate 28 lying between and parallel to the base and end walls 22 and 24 and separates the head chamber into a fuel-air intake chamber 30 on the side adjacent the base wall 22 and an exhaust chamber 32 on the side adjacent the end wall 24. Various tubes welded to the divider plate 22 extend across either the intake chamber or the exhaust chamber or across both the intake and exhaust chambers for reception of various engine components and to establish communication between the cylinders and the respective chambers.

Referring to FIG. 2 of the drawings, the four cylinders of the engine are located equal distances from the central axis of the engine and equal distances from each other circumferentially with respect to the central axis and, hence, are located in diametrically opposite pairs. Each cylinder has four valves, two of which are intake valves and the remaining two of which are exhaust valves. In particular each cylinder has a variable time intake valve (VI) a fixed time intake valve (FI), a combustion exhaust valve (CE) and a steam exhaust valve (SE). All of the valves are carried by valve guides 34 mounted in the end plate 24 and are urged closed by valve springs 36 engaged between the plate 24 and keepers 38. Each valve is operated by a rocker arm 44 carried by a bracket 42 affixed to the end wall 24. The valve push rods run in clusters through the head chamber within oval tubes 46. The stems of all of the intake valves (VI and FI) are enclosed within tubes 48 that extend between the divider plate 28 and end plate 24 of the head and isolate the cylinder intake ports from the exhaust chamber of the engine head. The stems of the exhaust valves (CE and SE) are enclosed within tubes 50 that extend between the divider plate 28 and the base plate 22 of the head chamber, thereby to isolate the exhaust ports of the cylinders from the intake chamber 30 of the head, the tubes 50 thus constituting exhaust runners in the head for conducting exhaust to the exhaust chambers.

Various divider plates, e.g., 52 and 54, extend transversely across the exhaust chamber between the divider wall 28 and end wall 24 and are joined to the various tubes and to the perimeter wall 26 to divide the exhaust chamber into a steam exhaust section and a combustion exhaust section, as can be readily discerned from FIG. 2 of the drawings. The tubes 50 of the combustion exhaust valves (CE) open to sections along each side of the exhaust compartment, while the tubes for each of the steam exhaust valves open into a center section of the compartment. Combustion gases exhausted into the side sections leave the combustion exhaust section through openings 56 into exhaust pipes 58, while steam exhausted through the cylinders from the steam exhaust valves (SE) into the center steam exhaust section of the exhaust chamber is conducted through the openings 60 to steam exhaust pipes 62.

A spark plug 64 is threaded into a hole in the head base plate 22 at the center of each cylinder and is enclosed within a square tube 66 that extends all the way from the base plate 22 to the end plate 24 of the head chamber to isolate it from both the intake and exhaust chambers of the head. A valve cover 68 covers the components on the external surface of the end wall 24 of the head chamber. The respective ignition wires 70 are connected to fittings at the end of conductive connector bars 72 that pass through tubes 74 running through the valve cover chamber.

In the center of the head portion of the engine is a controllable hydraulic linear actuator (203) by which the timing of the variable time intake valves is controlled. The actuator is described in detail below. Also described below are the reed valves (106) that are installed on the base plate 22 within the intake chamber and are shown in the broken away portion of the lower left corner of FIG. 2.

Each of the four cylinders of the engine is defined at the head end by the base plate 22 of the head and at the bottom end by a cylinder base plate 76. The bore comprises a bore tube 78 and a head end cylinder ring 80 (see FIG. 3), the tube 78 and ring 80 being clamped together in a sandwich between the plates 22 and 76. The plates 22, 24 and 76 are clamped together with the various tubes and rings (and gaskets, not shown) between them by long studs 82 distributed around each cylinder, threaded into the cylinder base plate 76 and receiving nuts 84. Each cylinder, of course, receives a reciprocating piston (500), which is described in detail below.

Surrounding each cylinder in concentric relation is a tube 86 that extends between the cylinder base plate 76 and the head base plate 22 and defines with the corresponding cylinder bore tube 78 an annular portion of a supercharging chamber 88, which is further defined by the underside of the piston and the base plate 76. Each tube 86 has ports 90 suitably located on an outside wall, with respect to the axis of the engine, for communication with an intake plenum 92 containing a filter element 94 and having a valve plate 96 having inlet openings 98 that are normally closed by reed valves 100. Each pair of adjacent chambers 88 on opposite sides of the engine, with respect to an axial bisecting plane, communicate with one of the two intake plenums of the engine, which may be discerned from FIG. 2, where the intake plenums are visible or partly visible on the right and left sides of the figure.

During the upstrokes of each piston air is drawn into the supercharging chamber 88 through the inlet openings 98. On each downstroke of each piston the reed valves 100 close, and the air drawn in on the previous upstroke of the piston is expelled from the supercharging chamber through a series of outlet holes 102 in the ring 80 and registering holes 104 in the head base plate 22. The holes 104 are covered by reed valves 106 fastened to the surface of the head base plate 22 within the intake chamber (see FIGS. 2 and 3). The valves 106, of course, close on each piston upstroke and open on each piston downstroke. As is apparent from FIG. 3, the piston connecting rod (180) is sealed to the cylinder base plate 76 by a seal 107. A series of holes 108 in the bottom of each cylinder bore tube 78 allow incoming air to be drawn into the cylinder on each cylinder upstroke and allow that air to flow back out into the annular portion of the supercharging chamber 88 on each piston downstroke for delivery to the intake chamber through the outlet holes 102 and 104.

Figure 14:
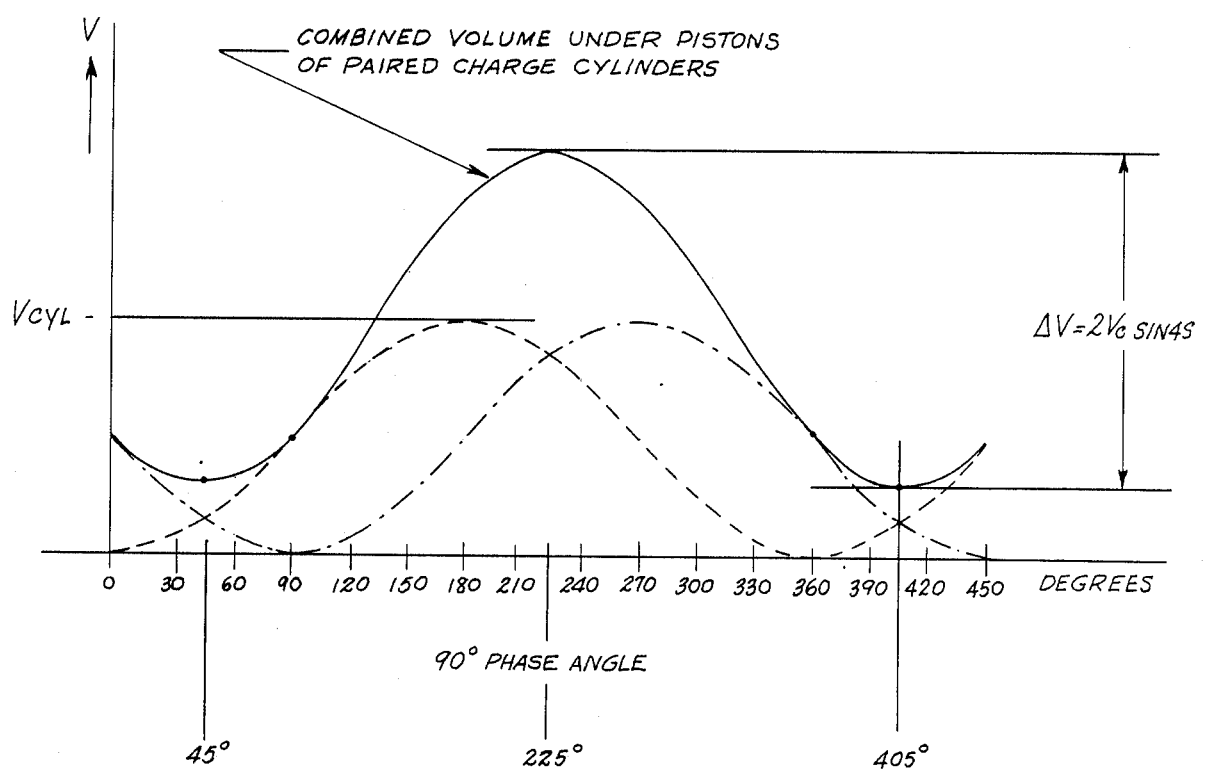
FIG. 14 is a graph that illustrates the effect of pairing cylinders for supercharging.

As mentioned above, the supercharging chambers 88 of adjacent cylinders are paired with each other. As described in more detail below, the paired cylinders operate 90° out of phase. Accordingly, the induction and discharge of air to and from each supercharging chamber does not occur over the entire upstroke and downstroke of the respective cylinders. Instead the supercharging of the engine involves the combined volumes under the pistons of the paired cylinders, as is shown graphically in FIG. 14. The combined supercharging effect of the paired cylinders occurs over the full 360° of the upstroke and downstroke of one piston plus 90° of the downstroke of the piston in the cylinder with which it is paired. The combined displacement volume therefore equals twice the displacement volume of a single cylinder times the sine of 45°. By pairing the cylinders the volume of supercharged air supplied to the intake chamber is less than it would be if each cylinder provided supercharging individually. In the case of a six-stroke cycle engine, according to the present embodiment, a reduction in supercharging by pairing of the cylinders provides a better balance between the work required to provide supercharging and the effect of that work in improving volumetric efficiency in the combustion cycle.

Adjacent to the base plate 76 of the cylinder section of the engine is a housing 110 (see FIGS. 1 and 1B) that contains the valve cams and the drive gear for the valve cams, which are described in detail below. One end of the main shaft 112 is supported in a needle bearing 114 that is affixed in an end plate 116 of the housing 110. The other end of the main shaft 112 is journaled in a double-row ball-bearing 118 carried in a transverse plate 120 that forms part of the crankcase 122 of the engine. A balance wheel 124 is affixed to the shaft adjacent to the bearing 118 within the crankcase. A flywheel 126 having a starter gear 128 and a belt pulley 130 are bolted to the end of the shaft in a casing outside.

A crosshead beam carrier 132, which is bored and splined at a 15° angle at its axis, is carried on a splined section of the shaft and is selectively movable axially of the shaft along the splines by an adjusting mechanism 134 (described in detail below) located between the carrier 132 and the balance wheel 124. Each of a pair of ballbearings 136 and 138 carries one of a pair of identical crosshead beams 140 and 142 (see FIGS. 1B and 1D). The arms of the beams 140 and 142 extend out from diametrically opposite protrusions 144 on the hub portion that fit into the recesses between the protrusions of the other crosshead beam. The protrusions on each crosshead beam hub portion are in sliding contact with the outer race of the bearing that supports the other crosshead beam, thus providing a more stable support for each crosshead beam. Each protrusion 144 is a little less than 90° in circumferential extent, so the recesses between the protrusions are slightly more than 90° in circumferential extent. The circumferential clearances between the protrusions and the recesses between the protrusions permit the cyclic relative rotation between the crossheads.

The outer end of each arm of each crosshead beam 140 and 142 is of circular cylindrical shape and is connected to a corresponding piston (500) by a connecting rod (180). A slider assembly 146 connects each beam to the connecting rod for rotation about two axes and for linear motion axially of the beam. Each slider assembly 146 comprises an outer box-like slide body 147 having a top, a bottom, two side walls and a back wall joined by screws, e.g., the four long cap screws that extend from the bottom through the side members and are screwed into the top member (see FIGS. 1B and 1D). The external surfaces of the side members and back member form a circular cylindrical running surface that runs within a circular cylindrical slide tube 148, the tube 148 serving as a slideway for the corresponding slider body and also constituting a structural component of the crankcase 122 in conjunction with plates 150 that are welded between adjacent tubes. The crankcase has flanges at the cylinder end for fastening the crankcase to the casing 110 by bolts (not shown).

Each slider assembly 146 further includes a coupling member 153 having a central bore that receives the cylindrical end portion of the corresponding crosshead beam arm, a major circular, cylindrical external surface and bushing tubes extending laterally out into holes in the side members in the slider body 147. Accordingly, each slider assembly 146 provides for linear in-and-out movement axially of the respective arm of the crosshead beam, relative rotation of the arm about an axis diametrically of the slideway tube and perpendicular to the arm, and slight cyclical rotation of the beam arm about the axis of the slide tube. Only one of the coupling members 153 associated with each of the crosshead beams 140 and 142 has a close-running fit with the corresponding side walls of the slider assembly 146. A positive clearance prevails at all times between the flat end faces of the coupling members at the opposite end of each crosshead beam and their corresponding slider assembly side walls. Accordingly, the torque reaction loads of each crosshead beam are carried by only one slider assembly, thus preventing possible binding of the crank mechanism.

The lower end of a hollow piston connecting rod 180 is connected to the top member 147b of the corresponding slider body 147, and the upper end is, of course, connected to the piston. The axes of the cylinders are aligned with the axes of the slideway tubes 148. Thus the usual ball joint connections required at both ends of the piston rods used with conventional Z-crank mechanisms are eliminated. Moreover, the resulting straight line motion of the piston rods makes it practical to provide the supercharging compression of air for the combustion cycle of the engine on the undersides of the pistons.

The two intake and two exhaust valves for each of the cylinders are operated by four annular face cams (see FIGS. 1, 1B, and 1C). The cams for the fixed time intake valve (FI) and both exhaust valves (CE and SE) are located on a main cam disc 182. The disc 182 is carried by a main cam shaft 184 that is supported at the upper end by a shoulder bearing 185 mounted on the base plate 22 of the engine head. The bearing 185 carries the reaction loads of the valve lifting forces. The main cam 182 is supported radially by the cam drive transmission, specifically, by idler gears 190 that mesh with an internal gear 186 of the drive, which is affixed to the main cam disc 182. In this prototype engine each lobe of each cam is provided by a detachable element 188 bolted and doweled to a track on the cam ring. Rotation of the cam 182 is the reverse of the engine rotation and at one-ninth of the engine speed and is provided by a 15-tooth pinion 189 on the cylinder end of the main shaft 112, three equally circumferentially spaced-apart idler gears 190 having 60 teeth and a 135-tooth internal gear 186. The shafts of the idler gears 190 are affixed to the end plate 116. Studs 155 on the end plate 116 extend through circumferentially elongated holes in a ring member 151 of the casing and receive nuts 152 that are accessible from outside the housing to enable rotational adjustment of the timing of the cams through the gear drive train.

Four side-by-side sets of four roller-type lifters 191 operate the valves through tubular push rods 192. In each set the flat sides of the lifters are in contact, which prevents individual rotation and keeps each lifter in true tracking alignment with the cam. The valve lifter guides 193 are mounted on the cylinder base plate 76.

The inner-most valve cam is on a separate disc 194 that is affixed to a tubular shaft 196 that extends toward the engine head and is concentric with main cam shaft 184. The upper end of the shaft 196 has two diametrically opposite lengthwise extending cam slots 198, each of which receives a corresponding follower 199 carried by a ring 200. Another pair of followers 199 on the ring 200 are received in cam grooves 202 formed diametrically opposite each other in the main cam shaft 184. The grooves 202 in the main cam shaft lie oblique to the longitudinal direction. The axial position of the ring 200 is controlled by a hydraulic actuator 203 mounted in the center of the head section and comprising a rolling diaphragm piston/cylinder 204 coupled by drive pins 206 to a drive ring 208. A thrust bearing is interposed between the drive ring 208 and the ring 200. Lubricating oil is continuously pumped by the engine oil pump through a line 210 (see FIG. 2) into the piston/cylinder 204. The oil pressure in the cylinder 204 is controlled by an adjustable pressure relief valve 212, which is adjusted by the engine operator, such as by use of an accelerator pedal of a vehicle. The piston/cylinder 204 works in opposition to a return spring 214 engaged in compression between a shoulder on the shaft 196 and the ring 200.

Axial movement of the ring 200 adjusts the angular position of the variable time cam ring 194 relative to the fixed time cam ring 182. When the cam that operates the variable time intake valve (VI) is in phase with the cam that operates the fixed time intake valve (FI) both intake valves are open throughout the intake stroke and closed throughout the compression stroke. Under the maximum retarded timing of the variable time intake valve no compression takes place, and the engine power output drops to near zero. By making the oblique cam grooves 202 in the main cam shaft 184 curved, a non-linear relationship between the axial position of the ring 200 and the phase relationship between the intake valve cams can be provided.

Figure 8:
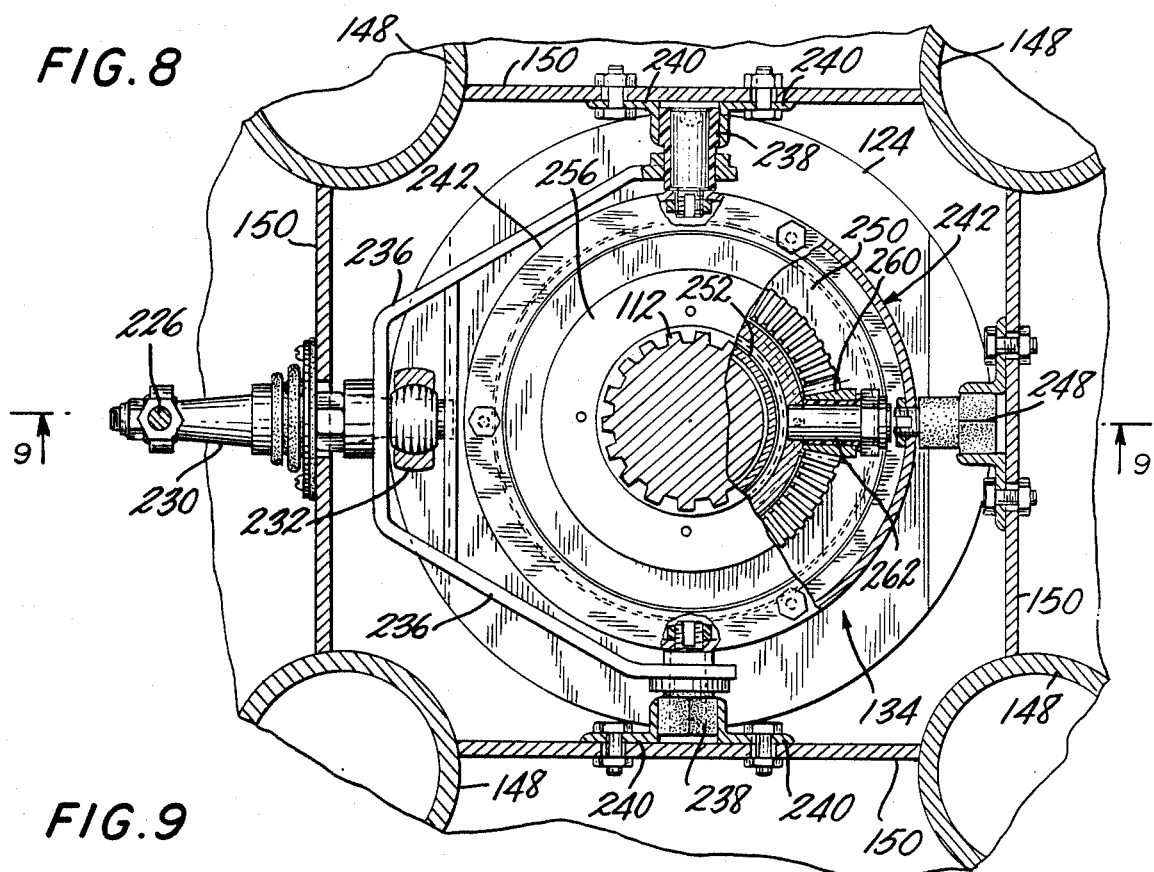
FIG. 8 is a partial end cross-sectional view of the crankcase section of an engine showing the mechanism for moving the crank assembly and pistons to vary the end clearance volumes, the view being taken generally along the plane represented by the lines 8—8 of FIG. 1 and in the direction of the arrows.
Figure 9:
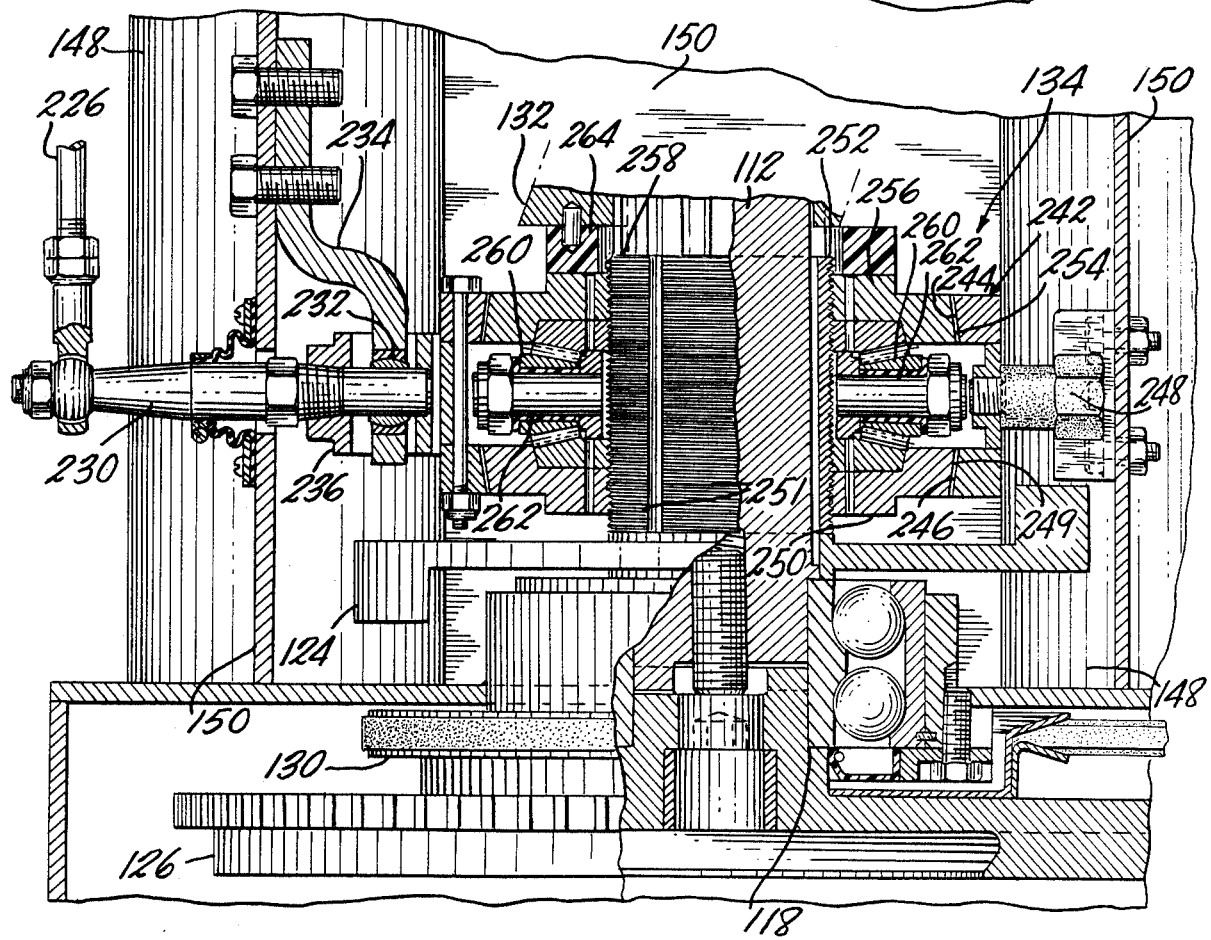
FIG. 9 is an axial cross-sectional view of the mechanism of FIG. 8, taken generally along the lines 9—9 of FIG. 8 and in the direction of the arrows.

In a preferred embodiment of the invention, and in the embodiment shown in the drawings, the axial position of the piston and crank assembly is automatically controlled in coordination with the control of the effective compression stroke, i.e., the phase relation between the fixed time cam and the variable time cam, by a linkage that operates the mechanism 134 that adjusts the axial position of the cross head carrier 132. As shown in FIGS. 1 and 3, one end of a bifurcated lever 220 is pivotably and slidably connected to couplings 222 extending out from diametrically opposite sides of the drive ring 208. The lever 220 is pivotably mounted by brackets 224 supported by the supercharging chamber cylinders 86 of two adjacent cylinders. The outer end of the lever 220 is pivotably coupled to a link 226 that leads through a hole sealed by a bellows seal 228 in the cylinder base plate 76 and is coupled at its other end to a lever 230 (see FIGS. 8 and 9), which is slidably supported in a ball joint 232 on a bracket 234 affixed to one of the crankcase wall plates 150.

The lever 230 includes a pair of divergent arms 236, each of which pivotably receives a guide shoe 238. Each shoe 238 runs in a guideway defined by guide members 240 affixed to a crankcase wall plate 150. The axes of the guideways lie in a diametrical plane of the engine that includes the axis of the main shaft. The guide shoes are affixed to an annular brake assembly 242 having inwardly facing conical upper and lower brake surfaces 244 and 246, respectively. The brake assembly 242 also carries a third guide shoe 248 located diametrically opposite the sliding ball joint 232 of the lever 230.

Immediately inwardly of the conical brake surface 246 of the brake assembly 242 is a complementary conical surface 249 of a brake ring 250 that is threaded onto fine right-hand threads 251 formed on a sleeve 252 affixed to the main shaft. Similarly, immediately inwardly of the upper brake surface 244 of the brake assembly 242 is a conical surface 254 on a brake ring 256 that is threaded onto a left-hand threaded portion 258 on the sleeve 252. The rings 250 and 256 have bevel ring gears that face each other and mesh with bevel pinion gears 260 carried by a spider 262 mounted on the sleeve 252 between the rings 250 and 256 for axial movement along and for rotation with the main shaft, the sleeve and spider being splined for this purpose.

The engine shown in the drawings is designed to drive the main shaft 112 clockwise, as viewed from the head end of the engine, so the valve cams are driven counterclockwise. Movement of the control ring 208 in a direction away from the head (toward the crankcase) in response to the control piston/cylinder 204 advances the timing of the variable time cam 194 by rotating the shaft 196 counterclockwise relative to the main cam shaft 184 and pivots the lever 220 in a direction such that the lever 230 pivots about the joint 232 and engages the brake surface 244 of the brake assembly 242 with the conical surface 254 of the ring 256. (It takes only a very slight movement of the control ring to engage the brake assembly 242 with one or the other of the rings 250 and 256.) Upon engagement of the surfaces 244 and 254, the rotation of the ring 256 is retarded, relative to the shaft, and the ring 256 threads itself along the left-hand sleeve threads 258 in a direction away from the engine head. In so doing, it also drives the bevel pinion gears, which, in turn, drive the other ring 250 clockwise, whereupon the ring 250 threads itself along the right-hand threads 251 of the sleeve and exactly tracks the movement of the ring 256. A thrust bearing 264 is interposed between the adjusting mechanism 134 and the crosshead beam carrier 132, and the carrier 132 follows the mechanism 134 along the shaft 112, in the present case away from the head, so that the end clearance is increased commensurately with the increased mass of air and fuel inducted and trapped in the cylinders when the variable time valves close.

When the drive ring 208 reaches a stable position in response to the control of the pressure relief valve 212, which sets the power level called for by the engine operator, both the timing of the variable time cam and the end clearance volume in the cylinders have been brought to an adjusted state. The mechanism 134 provides for the maintenance of a stable neutral position in which the conical surfaces 254 and 249 of the rings 256 and 250 run freely within the brake surfaces 244 and 246 of the brake assembly on a thin oil film. The fine pitch of the threads 251 and 258 makes the mechanism self-locking, and no external force is required to maintain the stable position. The mechanism, of course, not only moves down along the shaft 112, thereby to increase the clearance volume in coordination with a reduction in the phase delay between the variable time valves and the fixed time valves in response to a setting of the control valve, but also moves up to reduce the end clearance volume by operating in reverse of the operation just described upon engagement of the brake surface 246 with the ring 250.

Running of the rings 250 and 256 with the shaft in a neutral position within the brake assembly 242 is made possible by the slidable mounting of the lever 230 in the ball joint 232 and the pivoting and sliding motions allowed by the guide shoes 238 and 248. The guide shoes and the corresponding guideways support the weight of the brake assembly (in a horizontally mounted installation of the engine) and absorb the reaction forces in the circumferential direction when any brake shoes are engaged, but allow the brake ring to float in a neutral position in the absence of a movement imparted by the lever 230.

Fuel is supplied to the engine by a fuel injection system that comprises an engine driven fuel pump, which is described in detail below. The injection pump supplies fuel through separate fuel lines 300 to fuel injectors 302 threaded into holes in the base plate 22 of the engine head, there being a separate injector 302 located near the intake ports of each cylinder in each of the four corners of the head base plate 22 (see FIG. 2). The injectors are of special construction, and one is shown in detail at the bottom of FIG. 3.

Each injector comprises a casing 304 formed with a chamber 306, an inlet for connection of the chamber to the fuel line 300 and an outlet nozzle opening 308 that receives a poppet valve 310. One end of a short length of thin steel wire 312 is affixed to the poppet valve 310. The wire 312 runs through the chamber 306 and is affixed at its other end to an adjusting screw 314. By means of the adjusting screw 314 the wire 312 is elastically tensioned to hold the poppet valve 310 seated in the nozzle opening 308 up to a predetermined, preset cracking pressure, for example, 100 psi.

Referring to FIGS. 1 and 1C, the fuel pump 320, a water injector pump 322 (for the water injection system that supplies water to the cylinders for the steam cycle, as described in detail below) and the ignition system distributor 324 are driven at $\frac{1}{2}$ of the engine speed by a gear 326 mounted on the hub of one of the idler gears 190 of the valve cam gear drive train, a gear 328 supported by a bracket 330 attached to the casing 110, and individual output gears 332 and 334. The distributor 324 is of conventional construction and is not, therefore, described or illustrated in detail. The fuel pump and water injection pump are of unique construction and are also substantially identical, differing mainly only in the displacements of the pumping piston-cylinders and the regulator piston-cylinder. The construction of these pumps is shown FIGS. 10 to 12.

In the following description reference will be made to the fuel pump, with the understanding that the drawings and description are substantially fully applicable to the water injection pump. The fuel pump 320 comprises a casing that is made up of an inlet end member 350 and an outlet end member 352 and an internally lobed cam member 354 joined together end to end in a sandwich by bolts 356. A rotor 358 driven in rotation by the gear 332 is received within the casing, with suitable rotary seals interposed to isolate the inlet section, output section and pump section from each other, as more fully appears below. The inlet member 350 has an inlet passage 360 that leads to inlet passages 362 in the rotor, the passages 362 communicating, in turn, with a pumping chamber 364 extending axially along the rotor through a one-way inlet valve 366 interposed between the pumping chamber 364 and the inlet passages 362.

A pair of diametrically aligned radial pumping cylinders 368 in the rotor receive pistons 370 that are urged away from each other by a spring 372 into engagement with cam followers 374 that are slidably supported between abutments 375 on the rotor and work against four identical, equally spaced-apart internal lobes of the cam 354. Upon each outward stroke of the pistons 370 through a relatively long time Angle I of each lobe (FIG. 11), fuel is drawn into the pumping chamber 364 through the inlet valve 366 from a source (not shown) connected to the inlet 360 in the casing. On each inward stroke of the pistons 370 during the relatively short time Angle D (FIG. 11), which can be, say 20° of rotation of the pump rotor, the fuel trapped in the chamber 364 flows through radial passages 376 and a circumferential passage 378 in the rotor and through a passage 380 in the casing into a regulator cylinder 382. The displacement of a regulator piston 384 in the regulator cylinder 382 is controlled by a movable stop member 386, the position of which is established by an eccentric cam 388 operated by a lever 391. A spring 390 engaged under compression between the movable stop 386 and the piston 384 urges the piston to a fixed stop position established by the bottomed-out position shown in FIG. 10.

At a "zero" setting of the lever 391 the regulator piston 384 has a maximum displacement in the cylinder 382 equal to the total displacement of the two pumping piston-cylinders 370. Accordingly, all fuel pumped during the pumping strokes of the pistons 370 goes into the displacement volume of the regulator cylinder 382, the spring 390 being compressed so the piston 384 can move out into engagement with the variable stop 386. On the succeeding intake strokes of the pistons 370 the spring 390 of the regulator piston pushes the fuel out of the displacement volume of the regulator cylinder 382 and back into the displacement volumes of the pumping cylinders 368. In this instance no fuel is drawn in through the intake, and the pump provides no delivery of fuel through the outlet.

In the "max" position of the operating lever the eccentric cam 388 moves the variable stop 386 radially inward in the regulator cylinder 382 and engages the regulator piston 384 with the fixed stop, i.e., the bottomed-out position shown in FIG. 10. Accordingly, the displacement volume of the regulator cylinder becomes zero. Upon the inward strokes of the pumping pistons 370 a volume of fuel in the pumping chamber 364 equal to the displacement volumes of the pumping cylinders 368 is discharged through an outlet valve 392. The displacement volume of the regulator cylinder can, of course, be adjusted by the lever and cam to any amount between "0" and "max".

The rotor 358 has a radial passage 394 that communicates with an annular distribution chamber 396 defined between the rotor and the outlet end member 352. The outlet end member has four radial passages 398, each of which is plugged at its outer end and communicates with a tapped hole 400 to which the individual fuel lines for the respective fuel injectors can be connected (see nos. 1, 2, 3 and 4 in FIG. 12). A sealing strip 402 of a resilient low friction material is loosely connected by pins 404 to the rotor 358. The sealing strip 402 fits in resiliently sealed relation peripherially of the outlet chamber 396 and seals off the chamber 396 from the outlet openings 398 at all times except when a gap 406 between the ends of the strip 402 passes by one of the outlet openings 408. The phase relationship between the uncovering of each outlet opening of the distribution valve group and the working strokes of the pumping pistons 370 is established to provide delivery of a short burst of fuel under pressure through each of the outlets 1, 2, 3 and 4, whereby fuel is delivered to the individual injectors 302 sequentially. In accordance with known technology the lever 391 can be controlled by an air mass-flow sensor in one of the inlets 92 upstream of the leaf valves 100, thus providing an optimum amount of fuel upon each injection.

The construction and mode of operation of the water injection pump 322 are, as mentioned above, substantially identical to the fuel injection pump 320 shown in FIGS. 10-12 and just described. The only differences involve the maximum displacement volume, inasmuch as the amount of water supplied to the cylinders under any given operating conditions (other than during warm-up) is greater than the amount of fuel. A larger displacement can be provided by making the pistons and cylinders larger or providing more of them and increasing the stroke or bore of the regulator cylinder. The amount of water injected can be controlled thermostatically by sensing the temperature of the engine at one or more points indicative of the degree of heating of the cylinder walls, which will be a function of the amount of heat available to generate steam during the steam power stroke and, of course, will also reflect the extent to which cooling of the engine is required.

Water is conducted from each distributor outlet (1, 2, 3, 4) of the water injection pump 322 through a separate pipe 550 (FIG. 3) joined by a coupling 552 to an inlet passage 554 in a corresponding head end cylinder ring 80. The supply of water to the inlet passage 554 of each cylinder is timed (by the gear drive of the pump and of the main valve cam disc) to begin at a variable time before top-dead-center, the maximum volume of injection beginning, say, 45° before top-dead-center, at the end of the exhaust stroke and to end at or just after top-dead-center. An inherent characteristic of both the water and fuel injection pumps is that the beginning of delivery varies according to the setting of the variable stop for the regulator piston, while the end of delivery is fixed (end of working stroke of the pumping pistons-)—delivery does not begin until the regulator cylinder fills to the maximum allowed by the variable stop. This characteristic is highly desirable in the case of the water pump to maximize the steam pressure at or near top-dead-center but is of no consequence in the fuel pump.

Figure 4:
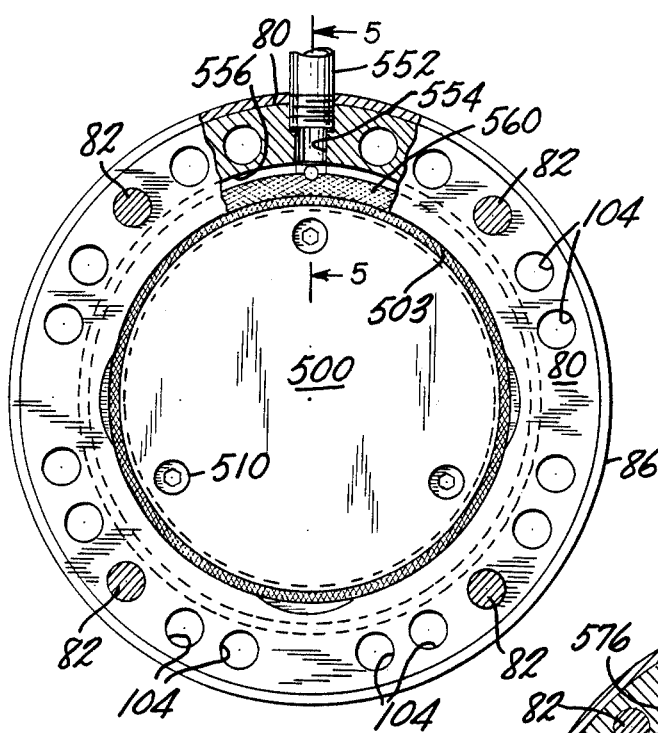
FIG. 4 is a detailed top view of a cylinder and the associated top ring that forms the head end of the supercharging chamber, a portion being broken away to show one form of water-injection system for an engine having a steam cycle.
Figure 5:
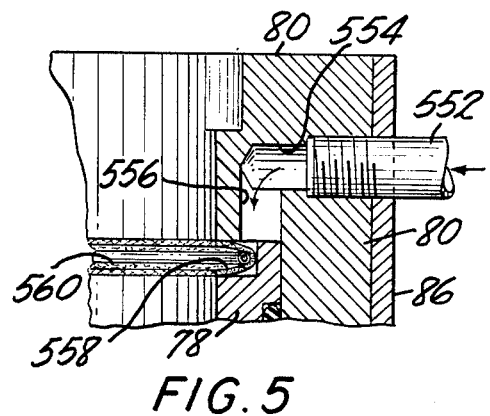
FIG. 5 is a fragmentary detailed side cross-sectional view of a water-injection nozzle for a cylinder taken along the lines 5—5 of FIG. 4.

There are various ways of introducing water into the cylinders at the ends of the exhaust strokes; two examples are shown in the drawings. In the example of FIGS. 4 and 5 the inlet passage 554 leads to an annular water supply chamber 556 in the ring 80. A gap 558 between the ring 80 and the bore tube 78 receives a resilient annular lip seal 560. Each pulse of water pressure from the pump applied to the water in the chamber 556 forces the lip seal to open and pass a thin annular ribbon-like jet of water radially inwardly from the gap all the way around the cylinder. Meanwhile the engine piston is moving up the cylinder past the incoming jet. Thus, the water is distributed lengthwise along a band of the piston wall for very effective transfer of heat from the piston to the water, which flashes to steam, the energy of which delivers power on the downstroke of the piston. The end of the water injection pulse is made to coincide (by the timing in the gearing of the water injection pump to the piston stroke) with the arrival of the piston at or not more than 15 degrees after top-dead-center, whereupon the lip seal 560 resiles to seal again the gap. The water (in either the liquid or vapor phase) extracts heat from the piston and the cylinder head and bore walls. The steam is exhausted on the final upstroke of each full engine cycle of each piston through the steam exhaust valve SE and is conducted to an open-vented condenser (not shown).

Figure 6:
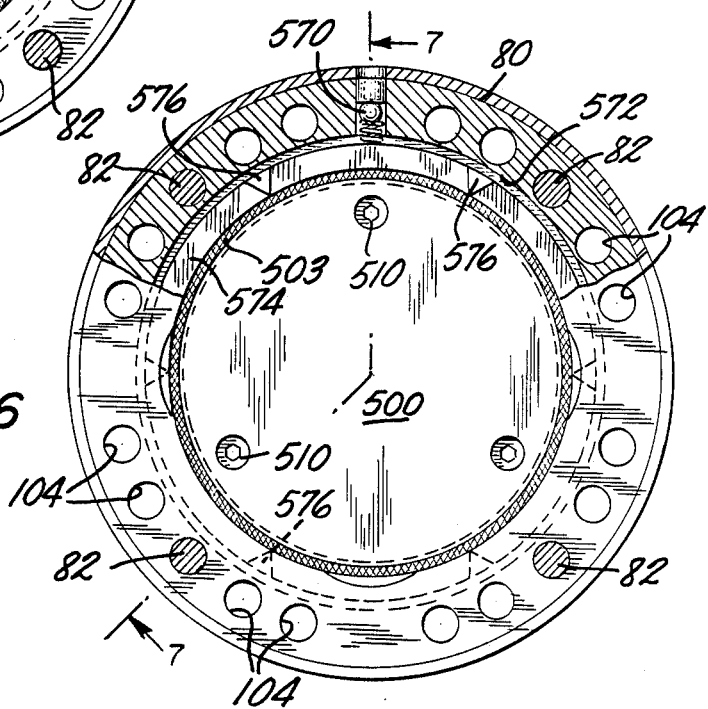
FIG. 6 is a detailed top view similar to FIG. 4 of a single cylinder and illustrates another water-injection nozzle system.
Figure 7:
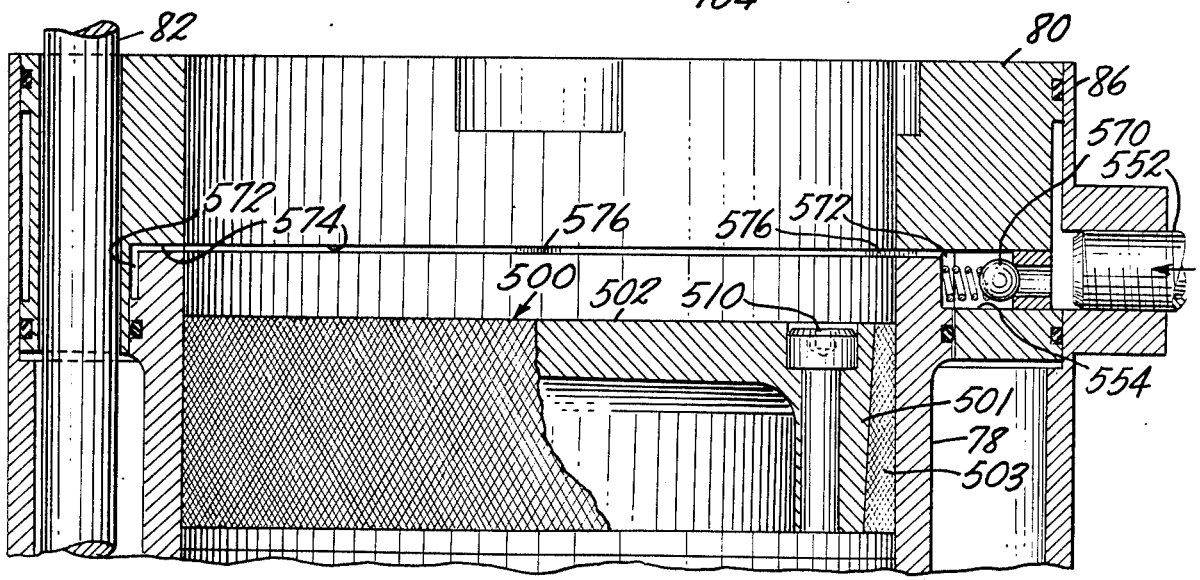
FIG. 7 is a cross-sectional view taken along a broken plane axially of the upper portion of a cylinder, as indicated by the lines 7—7 in FIG. 6.

In another example of a water distribution system, shown in FIGS. 6 and 7, a check valve 570 in the inlet 554 opens at the beginning of each water delivery pulse from the pump to the corresponding cylinder and admits water to an annular chamber 572, the check valve remaining closed throughout the rest of the engine cycle. The water flows around the chamber and is injected through very shallow (say about 0.002 to 0.005 in.) wide nozzle-grooves 574 ground in the head end of the bore tube 78, triangular bosses 576 being left to land the ring 80 on the tube 78. Each nozzle-groove delivers a generally radially directed wide ribbon-like jet of water against the surface of the upwardly moving piston giving a full 360° coverage.

The pistons of the engine are of special construction designed to store heat at the perimeter of the piston head and enable that heat to be given up rapidly and efficiently to water injected (as above) radially inwardly around the entire perimeter of the cylinder walls. Referring to FIG. 3, each piston 500 comprises an inverted cup-shaped head 502, preferably of aluminum for high thermal conductivity, having a downwardly and inwardly tapered peripheral surface 501 set in from the cylinder wall (see also FIG. 7). A ribbon of fine mesh stainless steel wire cloth is wound many times around the perimeter of the piston head surface 501, the ribbon being cut along a bias to form a point at the radially inward end, thereby producing a porous ring 503 having a cylindrical outer wall and a conical (tapered) inner wall that fills the gap between the perimeter wall of the head portion 502 and the cylinder wall but does not touch the cylinder wall. The height of the porous ring 503 and the location of the water injection nozzle are such that the water injection period coincides with the movement of the ring 503 past the nozzle. The taper of the porous ring maintains the ring in position on the head portion and ensures intimate metal-to-metal contact for good heat transfer. The ring has a large surface area to volume ratio such that it is capable of transferring heat rapidly.

A ring 506 of a suitable thermal insulating material, such as a ceramic having a low coefficient of thermal conductivity, is interposed between the piston head 502 and an aluminium skirt 508 to minimize heat flow from the piston head 502 to the cylinder bore walls through the piston rings. The head 502 is fastened to the skirt 508 by stainless steel bolts 510, which further minimizes heat flow between the head and the skirt. The skirt carries two sealing piston rings 512 and a porous bronze lubricating ring 514. The spokes of a hub 516 of the piston have radial passages 518, each of which receives a wick and is in communication with the hole in the hollow piston rod 180 which, in a manner described below, is supplied with oil. The oil flows through the passages 518 and permeates the bronze ring 514, whereby on each stroke of the piston a thin film of oil is applied to the cylinder walls for lubrication. The design is such that a minimum amount of oil is applied in order to limit the contamination of the steam generated in the steam cycle with oil. The piston hub 516 is secured by a bolt 519 to the piston connecting rod 180. A plate 520 on the bottom of each piston 500 isolates the space within the skirt and under the head from the supercharge chamber on the underside of the piston to prevent heat loss from the top of the piston.

Oil under pressure for lubrication of the engine and for operating the servomechanism that controls the variable time valves and the compression ratio (end clearance volume) is supplied by a suitable engine-driven oil pump (not shown). Many details of the engine lubrication system are omitted from the drawings and the present description, inasmuch as it is well within the ability of one with ordinary skill in the art to design them appropriately. In the case of the cylinder bores, however, special care is called for, as alluded to in the preceding paragraph.

In addition to having the porous bronze oil ring on each piston, the embodiment provides for a controlled supply of oil to the oil ring to meet the objective that the amount of oil be adequate for lubrication but as low as possible in order to minimize contamination of the steam and, hence, the condenser. In particular an oil distribution line 600 (see FIGS. 1B and 1D) runs entirely around the crankcase section and communicates with a port 602 in each slide tube 148. The back wall member 147a of each slider body 147 has an elongated port 604 that under maximum load conditions (i.e., maximum piston end clearance volume) registers with the port 602 during 45° of each piston stroke on either side of bottom dead center (see top of FIG. 1B), to allow oil under pressure from the supply pipe 600 to enter the slider body 147. (Under less than maximum load, the bottoms of the strokes of the sliders are higher, relative to the ports 602, so the duration of register with the ports 604 is shorter.) The timing of the register between the ports 602 and 604 associated with each slider and piston ensures that oil is supplied to each piston in sequence with no overlap, thus enabling equal distribution of oil among the cylinders from a single supply line (600).

Passages in the slider body distribute oil to the slideway tube walls and the bearing and sliding surfaces of the crosshead beam coupling to the slide body. In addition oil is conducted through a passage 606 in the top wall 147b of each slider body 147, which communicates with the inside of the tubular piston connecting rod 180. The oil is conducted through the piston rod to the passages 518 in the piston hub 508, thereby to supply the oiling ring 514 with a controlled amount of oil on each piston upstroke. Any excess oil in the cylinder bores under the piston will migrate to the low point in the bore and will be forced by the supercharge pressure through small drain holes (not shown) in the base wall 76 into the crankcase section.

Figure 13:
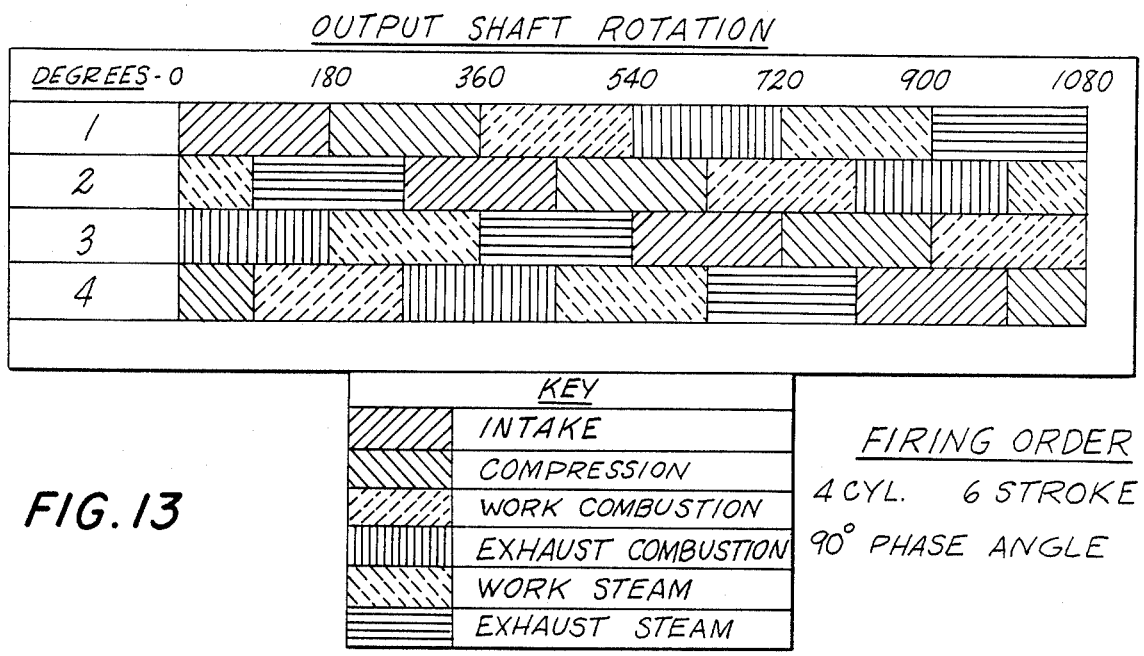
FIG. 13 is a timing diagram for the embodiment.

The timing chart (FIG. 13) is basically self-explanatory. The four cylinders fire in order around the engine axis in reverse of the direction of the output shaft rotation at a 90° phase angle. Each piston/cylinder carries out the six strokes of the engine cycle during 1080° (3 revolutions) of shaft rotation.

At the end of the steam exhaust stroke, a small amount of steam will remain in each cylinder and will mix with the fuel-air charge inducted on the next intake stroke and then be emitted in the next combustion exhaust stroke, which means a small loss (consumption) of water. The mixing of steam in the fuel-air charge has the desirable effect on combustion of reducing detonation.

The condenser has to be vented to clear the small amounts of combustion products that remain in the cylinders at the end of the combustion exhaust stroke and leave with the steam at the end of the steam exhaust stroke. Some steam will be lost from the condenser as a result.

During warm up, when no water is injected, a vacuum will be generated in each cylinder during the then non-operative steam power stroke. When the steam exhaust valve opens, ambient air from the condenser will be drawn in and then pushed back out. Since the condenser vent should be small to minimize vapor loss, a bypass in the line from the steam exhaust chamber to the condenser with a three-way valve controlled in concert with the water supply is provided to accommodate the air-pumping condition during warm up.

It is estimated that the total water loss will be about five percent of the water consumption (flow) in the steam cycle. Water consumption should run about four times fuel consumption (by volume), so the water loss will be about 20 percent of the fuel consumption by volume.

The embodiment described above and shown in the drawings is exemplary, and numerous variations and modifications will be readily apparent to those of ordinary skill in the art. For example, the engine air supply system (supercharging and variable intake valves), though preferred for a gain in efficiency, can be omitted and replaced by a throttle-type induction control system. The four fuel injectors can be replaced by a single injector in the center of the intake chamber, in which case the hydraulic linear actuator 203 can be moved to another location, such as in the linkage between the adjustment mechanism for the variable time valve cam and the compression ratio adjustment mechanism. The mechanism of the embodiment for adjusting the compression ratio can be replaced by another type of linear actuator. The above-mentioned modifications are by no means all inclusive.

I claim:

1. An engine comprising an output shaft journaled in a crankcase for rotation about an axis, an even number of cylinders, each having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, at least one intake port for each cylinder having a cam-actuated valve, the cams that actuate the intake valves being timed to open the intake valve of each cylinder for induction of a mixture of fuel and air every third down-stroke of the corresponding piston, a combustion gas exhaust port for each cylinder having a cam-actuated valve, a steam exhaust port for each cylinder having a cam-actuated valve, the combustion exhaust and steam exhaust valves being timed such that the engine operates in a six-stroke cycle consisting of a four-stroke combustion cycle and a two-stroke steam cycle, means for injecting water into each cylinder at the end of each combustion exhaust stroke of the corresponding piston, an intake manifold communicating with the intake ports of all of the cylinders, means for supplying air to the intake manifold, and means for injecting fuel into the intake manifold including at least one fuel injector, the intake manifold being a chamber defined in part by head walls of the engine cylinders, whereby the air and fuel supplied to the manifold are preheated by the cylinder head walls to vaporize the fuel, and the cylinder head walls are cooled by the incoming air and fuel, and the fuel injector comprising a body defining a chamber, an inlet opening to the chamber, and an outlet opening from the chamber, a poppet valve member adapted to seat in sealed relation in the outlet opening, and an elastically tensioned thin wire fastened at one end to the valve member, extending through the chamber and fastened at the other end to the body.

2. An engine comprising an output shaft journaled in a crankcase for rotation about an axis, an even number of cylinders, each having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, at least one intake port for each cylinder having a cam-actuated valve, the cams that actuate the intake valves being timed to open the intake valve of each cylinder for induction of a mixture of fuel and air every third down-stroke of the corresponding piston, a combustion gas exhaust port for each cylinder having a cam-actuated valve, a steam exhaust port for each cylinder having a cam-actuated valve, the combustion exhaust and steam exhaust valves being timed such that the engine operates in a six-stroke cycle consisting of a four-stroke combustion stroke and a two-stroke steam cycle, and means for injecting water into each cylinder at the end of each combustion exhaust stroke of the corresponding piston, the means for moving the crosshead beam carrier axially along the shaft including a spider received adjacent the carrier for rotation with and axial movement along the shaft and carrying rotatable bevel gears, a first threaded portion on the shaft on the side of the spider nearer the beam carrier, a second threaded portion of opposite hand from the first on the shaft on the other side of the spider, a first ring having a bevel ring gear meshing with the bevel gears and threaded internally onto the first threaded portion, a thrust bearing interposed between the first ring and the carrier, a second ring having a bevel ring gear meshing with the bevel gears and threaded internally onto the second threaded portion, first and second conical brake surfaces on the respective first and second rings, a brake sleeve having first and second brake surfaces matching the respective brake surfaces on the first and second rings, and control means for selectively shifting the brake sleeve axially of the shaft in one direction to engage the first brake sleeve surface with the brake surface of the first ring and in the other direction to engage the second brake sleeve surface with the brake surface of the second ring, whereby the rotation of the ring that is so engaged is retarded relative to the shaft, the bevel gears advance the rotation of the other ring and the two rings thread themselves along the threaded portions of the shaft and move the carrier axially along the shaft.

3. An engine according to claim 2 and further comprising a lubricating oil supply port opening at an internal surface of each slideway at a location swept by the slider, an elongated oil intake port opening at an external surface of each slider at a location for register with the supply port for a varying but predetermined time before and after bottom-dead-center of the slider and oil passages through the slider, connecting rod and piston communicating the intake port of each slider to a lubricating ring on a lower portion of the corresponding piston, whereby a controlled amount of oil is supplied during a part of each piston stroke to the lubricating ring, which in turn wipes a thin film of oil on the cylinder wall.

4. An engine comprising an output shaft journaled in a crankcase for rotation about an axis, an even number of cylinders, each cylinder having a bore portion defined by a bore tube and having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, at least one intake port for each cylinder having a cam-actuated valve, the cams that actuate the intake valves being timed to open the intake valve of each cylinder for induction of a mixture of fuel and air every third downstroke of the corresponding piston, a combustion gas exhaust port for each cylinder having a cam-actuated valve, a steam exhaust port for each cylinder having a cam-actuated valve, the combustion exhaust and steam exhaust valves being timed such that the engine operates in a six-stroke cycle consisting of a four-stroke combustion cycle and a two-stroke steam cycle, means for injecting water into each cylinder at the end of each combustion exhaust stroke of the corresponding piston, means defining a supercharging chamber adjacent each cylinder, said means including the underside of the piston, a wall having an opening through which the corresponding connecting rod passes, a wall surrounding and spaced from the bore tube, thus to define an annular portion of the supercharging chamber, and a seal between the rod and the wall at the opening, first one-way valve means for admitting ambient air to the supercharging chamber upon each upstroke of the piston, second one-way valve means for discharging compressed air from the supercharging chamber upon each downstroke of the piston, an intake chamber communicating with the supercharging chambers through the second one-way valves and with the cylinder intake ports, and a plurality of spaced-apart discharge openings having said second one-way valve means adjacent the head end of the annular portion, whereby air inducted into the supercharging chamber passes through the annular portion to the discharge openings.

5. An engine according to claim 4 wherein the supercharging chamber associated with each cylinder communicates with the supercharging chamber associated with another cylinder that is out of phase with it but in which the piston downstrokes partially overlap, whereby the combined effective displacement volume of the paired chambers is less than the total of the individual displacement volumes of the paired chambers.

6. An engine comprising an output shaft journaled in a crankcase for rotation about an axis, an even number of cylinders, each having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, at least one intake port for each cylinder having a cam-actuated valve, the cams that actuate the intake valves being timed to open the intake valve of each cylinder for induction of a mixture of fuel and air every third downstroke of the corresponding piston, a combustion gas exhaust port for each cylinder having a cam-actuated valve, a steam exhaust port for each cylinder having a cam-actuated valve, the combustion exhaust and steam exhaust valve being timed such that the engine operates in a six-stroke cycle consisting of a four-stroke combustion cycle and two-stroke steam cycle, means for injecting water into each cylinder at the end of each combustion exhaust stroke of the corresponding piston, an intake manifold communicating with the intake ports of all of the cylinders, means for supplying air to the intake manifold, and means for injecting fuel to the intake manifold including at least one fuel injector and an injection pump having a housing, a rotor rotatably received in the housing, an internal lobed cam in the housing, a pair of diametrically opposed pistons received in pumping cylinders in the rotor and spring-loaded into enagement with the cam, a chamber in the rotor communicating with the pumping cylinders and having an inlet with a check valve and an outlet with a check valve, a regulator cylinder in the housing in constant communication with the rotor chamber, a regulator piston in the regulator cylinder resiliently biased toward a fixed stop establishing a minimum regulator cylinder volume, and an adjustable stop in the regulator cylinder establishing a selected variable stroke of the regulator piston away from the fixed stop.

7. An engine according to claim 6 wherein the adjustable stop is adapted to establish a regulator piston stroke in the range from substantially zero to a stroke providing a displacement volume of the regulator cylinder substantially equal to the total displacement volumes of the pumping cylinders.

8. An engine according to claim 6 wherein the injection pump further includes an annular discharge chamber defined between an internal circular cylindrical wall portion of the housing and the rotor, circumferentially spaced-apart discharge passages in the housing opening at said wall portion into the discharge chamber, and a sealing strip connected to the rotor for rotation therewith and resiliently and slidably engaging a major portion of said housing wall portion and adapted sequentially to lose all but one of the discharge passages, whereby the discharge passages are opened seriatim to the discharge chamber.

9. An engine comprising an output shaft journaled in a crankcase for rotation about an axis, an even number of cylinders, each having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, at least one intake port for each cylinder having a cam-actuated valve, the cams that actuate the intake valves being timed to open the intake valve of each cylinder for induction of a mixture of fuel and air every third downstroke of the corresponding piston, a combustion gas exhaust port for each cylinder having a cam-actuated valve, a steam exhaust port for each cylinder having a cam-actuated valve, the combustion exhaust and steam exhaust valves being timed such that the engine operates in a six-stroke cycle consisting of a four-stroke combustion cycle and a two-stroke steam cycle, and means for injecting water into each cylinder at the end of each combustion exhaust stroke of the corresponding piston, each piston having a ring of porous thermally conductive material around the perimeter of the top, such material having a high ratio of surface area to mass, and the means for injecting water including nozzle means associated with the top of the cylinder wall for injecting water generally radially into and substantially entirely around the porous conducting ring, whereby the water permeates the ring and flashes to steam that provides the steam power stroke of the steam cycle, and further including control means for regulating the quantity of water injected for the steam cycles in relation to the engine temperature by varying the duration of each injection, the times of the beginnings of the injections being varied and the ends of the injections being fixed and being substantially at top dead center at the beginning of each steam power stroke.

10. An engine according to claim 9 wherein the porous ring is a band of fine wire mesh wrapped in numerous layers around the top of the piston.

11. An engine according to claim 9 wherein each piston includes a head member, the porous material being received on the head member, a skirt member, at least one ring on the skirt member engaging the cylinder wall and forming a sliding seal therewith, and a member of a thermally insulating material interposed between the head member and the skirt member for inhibiting heat flow from the head member to the cylinder wall via the skirt member and ring.

12. An engine according to claim 9 wherein the means for injecting water into each cylinder includes an injection pump having a housing, a rotor rotatably received in the housing, an internal lobed cam in the housing, a pair of diametrically opposed pistons received in pumping cylinders in the rotor and spring-loaded into engagement with the cam, a chamber in the rotor communicating with the pumping cylinders and having an inlet with a check valve and an outlet with a check valve, a regulator cylinder in the housing in constant communication with the rotor chamber, a regulator piston in the regulator cylinder biased toward a fixed stop establishing a minimum regulator cylinder volume, an adjustable stop in the regulator cylinder establishing a selected variable stroke of the regulator piston away from the fixed stop, outlet distributor valve means downstream from the outlet from the chamber, and lines communicating the distributor means to each engine cylinder.

13. An engine according to claim 12 wherein the adjustable stop is adapted to establish a regulator piston stroke in the range from substantially zero to a stroke providing a displacement volume of the regulator cylinder substantially equal to the total displacement volumes of the pumping cylinders.

14. An engine according to claim 12 wherein the distributor valve means of the injection pump includes an annular discharge chamber defined between an internal circular cylindrical wall portion of the housing and the rotor, circumferentially spaced-apart discharge passages in the housing opening at said wall portion into the discharge chamber, and a sealing strip connected to the rotor for rotation therewith and resiliently and slidably engaging a major portion of said housing wall portion and adapted sequentially to close all but one of the discharge passages, whereby the discharge passages are opened seriatim to the discharge chamber.

15. An engine comprising an output shaft journaled in a crankcase for rotation about an axis, an even number of cylinders, each having its axis parallel to the shaft axis, arranged in diametrically opposite pairs radially equidistant from the shaft axis and equally spaced-apart circumferentially, a piston movable axially along each cylinder, a crosshead beam for each pair of pistons connected to the respective pistons and journalled on a carrier that is received on the shaft for rotation with and movement axially along the shaft, the pistons being connected by connecting rods to the crosshead beams by slider assemblies, each of which includes a cylindrical slideway affixed to a crankcase housing and having an axis aligned with the corresponding cylinder, a slider received in each slideway, and means coupling the corresponding crosshead beam to the slider for biaxial rotation and for axial sliding motion of the beam relative to the connecting rod, whereby the piston connecting rods move solely axially of the cylinders, means for selectively moving the carrier axially along the shaft to vary the end clearance volumes of the cylinders, two intake ports for each cylinder, each having a cam-actuated valve, the cams that actuate the intake valves being timed to open the intake valve of each cylinder for induction of a mixture of fuel and air every third downstroke of the corresponding piston, a combustion gas exhaust port for each cylinder having a cam-actuated valve, a steam exhaust port for each cylinder having a cam-actuated valve, the combustion exhaust and steam exhaust valves being timed such that the engine operates in a six-stroke cycle consisting of a four-stroke combustion cycle and a two-stroke steam cycle, means for injecting water into each cylinder at the end of each combustion exhaust stroke of the corresponding piston, means for selectively varying the timing of one of the intake valves of each cylinder to vary the mass of a mixture of fuel and air inducted into the respective cylinder by delaying the closing of the variable timed valve until a selected time during the next upstroke of the piston, and means for actuating the means for moving the carrier and the means for varying the intake valve timing in a predetermined relationship, the cam actuating the other intake valve of each cylinder operating at a fixed timing, relative to the rotation of the shaft, and the cams of the variable time valves and the cams of the fixed time valves being adapted to open the respective valves for substantially equal rotational durations and the means for varying the timing of the variable time valves varying the phase relationship between the cams thereof and the cams of the fixed time valves, the variable time valves thus opening and closing at a rotational time that varies from zero to a predetermined variable rotational time later than the fixed time valves, whereby part of the induced mass of the mixture is expelled during the upstroke as a function of the phase delay between the opening of the fixed time valve and the variable time valve of each cylinder.

16. An engine according to claim 15 wherein the means for moving the carrier axially along the shaft includes a spider received adjacent the carrier for rotation with and axial movement along the shaft and carrying rotatable bevel gears, a first threaded portion on the shaft on the side of the spider nearer the beam carrier, a second threaded portion of opposite hand from the first on the shaft on the other side of the spider, a first ring having a bevel ring gear meshing with the bevel gears and threaded internally onto the first threaded portion, a thrust bearing interposed between the first ring and the carrier, a second ring a bevel ring gear meshing with the bevel gears and threaded internally onto the second threaded portion, first and second conical brake surfaces on the respective first and second rings, a brake sleeve having first and second brake surfaces matching the respective brake surfaces on the first and second rings, and control means for selectively shifting the brake sleeve axially of the shaft in one direction to engage the first brake sleeve surface with the brake surface of the first ring, and in the other direction to engage the second brake sleeve surface with the brake surface of the second ring, whereby the rotation of the ring that is so engaged in retarded relative to the shaft, the bevel gears advance the rotation of the other ring and the two rings thread themselves along the threaded portions of the shaft and move the carrier axially along the shaft.

17. An engine according to claim 16 and further comprising linkage means coupling the means for varying the timing of the variable time valves and the control means of the means for moving the carrier for automatically providing a predetermined relationship between the mass of the fuel-air mixture inducted into the cylinders and the end clearance volumes of the cylinders.

18. An engine according to claim 17 wherein the linkage means includes a fork lever carrying the brake sleeve for pivoting about an axis extending diametrically of the brake sleeve and means mounting the lever and brake sleeve in the crankcase for free-floating in a neutral position in which the brake surfaces of the first and second rings run on oil films within the brake surfaces of the brake sleeve in the absence of an external force applied to the lever to move the pivot axis of the brake ring axially of the shaft.

19. An engine according to claim 15 wherein the cam actuating the fixed time valves is a first rotary annular face cam driven by the shaft in a fixed phase relationship to the rotation of the shaft, the cam actuating the variable time valves is a second rotary annular face cam and the means for varying the timing of variable time valves includes a coupling connecting the second cam to the first cam in any selected one of an infinite number of relative angular positions within a range between a fully in-phase relation for full power and a substantially out-of-phase relation for substantially less than full power.

20. An engine according to claim 19 wherein the first cam lies radially outwardly of the second cam and is carried by a shaft that rotates about an axis aligned with the main shaft, the second cam includes a tubular shaft surrounding and supported by the shaft of the first cam, and the coupling comprises phase control cam slots in the valve cam shafts and control cam followers received in the control slots for movement lengthwise and circumferentially of the valve cam shafts.

21. An engine according to claim 20 wherein the control followers are carried by a ring, and further comprising a controllable linear actuator coupled through a thrust bearing to the ring.

* * * * *